(12) United States Patent
DeStefano

(10) Patent No.: US 6,307,552 B1
(45) Date of Patent: *Oct. 23, 2001

(54) COMPUTER SYSTEM AND METHOD FOR CONTROLLING THE SAME UTILIZING AN ABSTRACTION STACK WITH A SEQUENCE OF PREDETERMINED DISPLAY FORMATS

(75) Inventor: George Francis DeStefano, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,915

(22) Filed: Mar. 16, 1998

(51) Int. Cl.⁷ .................................................. G06T 15/00
(52) U.S. Cl. ........................................... 345/419; 345/433
(58) Field of Search ..................................... 345/419, 433

(56) References Cited

U.S. PATENT DOCUMENTS

| | | | |
|---|---|---|---|
| 4,663,616 | 5/1987 | Himelstein | 340/724 |
| 4,860,218 | 8/1989 | Sleator | 364/518 |
| 4,868,765 | 9/1989 | Diefendorff | 364/521 |
| 4,964,077 | 10/1990 | Eisen et al. | 364/900 |
| 5,122,972 | 6/1992 | Richards et al. | 395/157 |
| 5,186,629 | 2/1993 | Rohen | 434/114 |
| 5,255,356 | 10/1993 | Michelman et al. | 395/148 |
| 5,297,249 | 3/1994 | Bernstein et al. | 395/156 |
| 5,301,301 | 4/1994 | Kodosky et al. | 395/500 |
| 5,335,320 | 8/1994 | Iwata et al. | 395/155 |
| 5,361,361 | 11/1994 | Hickman et al. | 395/700 |
| 5,363,482 | 11/1994 | Victor et al. | 395/157 |
| 5,416,903 | 5/1995 | Malcolm | 395/155 |
| 5,438,662 | 8/1995 | Randall | 395/161 |
| 5,461,399 | 10/1995 | Cragun | 345/145 |

(List continued on next page.)

OTHER PUBLICATIONS

Shaw (compiler), *Microsoft Office 6–in–1 New Edition*, pp. 385, 419–424, 1994.*
Michelle Shaw, *Microsoft® Office 6–in–1*, Que Corporation, (1994) pp. 10–11, 14–15, 40 and 42–43.
*Screen Shot of Microsoft Works Software Application*, (no date).
*Screen Shots of Lotus Notes Software Application*, (no date).
"Visualizing the Information Space of Hypermedia Systems", *Graphics Visualization & Usability Center*, (no date).
Screen shots of Corel®WordPerfect 6.1 Find/Replace Text, Fig. 1, p. 1, (1996).
Elder et al., "Architecture for Platform and Presentation Independent User Interface for Applications", *IBM® Technical Disclosure Bulletin*, vol. 38, No. 1, pp. 297–302, (Jan. 1995).
Brittan, David, "MIT Reporter", *Technology Review*, pp. 12–14, (Feb. 1997).

Primary Examiner—Mark Zimmerman
Assistant Examiner—Lance W. Sealey
(74) Attorney, Agent, or Firm—Wood, Herron & Evans; Steven W. Roth

(57) ABSTRACT

A computer system and method of controlling the same in which an abstraction stack is sequenced through a number of predetermined display formats to facilitate user comprehension of a body of knowledge. An abstraction stack is utilized to present information from a body of knowledge in a three-dimensional workspace to facilitate user comprehension and management of both the specific information in the body of knowledge, as well as the contextual relationships of the information within the body of knowledge as a whole. Moreover, a number of predetermined display formats are defined for the abstraction stack to permit the presentation of information to a user to be optimized throughout a sequence of predefined steps.

32 Claims, 10 Drawing Sheets

U.S. PATENT DOCUMENTS

| | | |
|---|---|---|
| 5,483,632 | 1/1996 | Kuwamoto et al. .................. 395/156 |
| 5,506,937 | 4/1996 | Ford et al. ............................. 395/12 |
| 5,528,744 | 6/1996 | Vaughton .............................. 395/157 |
| 5,610,828 | 3/1997 | Kodosky et al. ..................... 364/489 |
| 5,613,134 | 3/1997 | Lucus et al. .......................... 395/788 |
| 5,615,326 | 3/1997 | Orton et al. .......................... 395/356 |
| 5,617,114 | 4/1997 | Bier et al. ............................. 345/113 |
| 5,621,874 * | 4/1997 | Lucas et al. .......................... 395/761 |
| 5,644,740 | 7/1997 | Kiuchi .................................. 395/357 |
| 5,689,642 | 11/1997 | Harkins et al. ................. 395/200.04 |
| 5,694,561 | 12/1997 | Malamud et al. .................... 395/346 |
| 5,760,772 | 6/1998 | Austin .................................. 345/342 |
| 5,771,042 | 6/1998 | Santos-Gomez ..................... 345/342 |
| 5,771,283 | 6/1998 | Smith ................................... 345/342 |
| 5,796,402 | 8/1998 | Ellison-Taylor ..................... 345/342 |
| 5,802,514 | 9/1998 | Huber ........................................ 707/4 |
| 5,808,610 | 9/1998 | Benson et al. ....................... 345/342 |
| 5,812,804 | 9/1998 | Bates et al. .......................... 395/342 |
| 5,815,151 | 9/1998 | Argiolas ............................... 345/342 |
| 5,819,055 | 10/1998 | MacLean et al. .................... 395/342 |
| 5,835,088 | 11/1998 | Jaaskelainen, Jr. .................. 345/343 |
| 5,856,826 | 1/1999 | Craycroft ............................. 345/346 |
| 5,874,962 | 2/1999 | de Judicibus et al. .............. 345/342 |
| 5,874,964 | 2/1999 | Gille ..................................... 345/356 |
| 5,880,733 | 3/1999 | Horvitz et al. ....................... 345/355 |
| 5,894,311 | 4/1999 | Jackson ................................ 345/440 |
| 5,900,876 | 5/1999 | Yagita et al. ......................... 345/350 |
| 5,909,690 | 6/1999 | Tanigawa et al. ................... 707/526 |
| 5,912,668 | 6/1999 | Sciammarella et al. ............. 345/348 |
| 5,920,314 | 7/1999 | Maesano et al. ..................... 345/340 |
| 5,937,400 | 8/1999 | Au .......................................... 706/55 |
| 5,973,702 * | 10/1999 | Orton et al. .......................... 345/433 |
| 6,002,401 | 12/1999 | Baker ................................... 345/349 |
| 6,012,072 | 1/2000 | Lucas et al. .......................... 707/526 |
| 6,031,989 | 2/2000 | Cordell ................................. 395/701 |
| 6,088,032 | 7/2000 | Mackinlay ........................... 345/355 |
| 6,097,375 | 8/2000 | Byford ................................. 345/169 |

* cited by examiner

COMPUTER SYSTEM AND METHOD FOR CONTROLLING THE SAME UTILIZING AN ABSTRACTION STACK WITH A SEQUENCE OF PREDETERMINED DISPLAY FORMATS

CROSS-REFERENCE-TO RELATED-APPLICATIONS

This application is related to the co-pending application, which was filed on even date herewith by George Francis DeStefano, U.S. Ser. No. 09/039,916 entitled "COMPUTER SYSTEM AND METHOD FOR CONTROLLING THE SAME UTILIZING LOGICALLY-TYPED CONCEPT HIGHLIGHTING". This application is also related to the following co-pending applications which were filed on Feb. 9, 1998 by George Francis DeStefano: U.S. Ser. No. 09/020,668 entitled "COMPUTER SYSTEM AND METHOD FOR AUTHORING, ABSTRACTING AND ACCESSING A BODY OF KNOWLEDGE"; U.S. Ser. No. 09/020,534 entitled "COMPUTER SYSTEM, METHOD AND USER INTERFACE COMPONENTS FOR ABSTRACTING AND ACCESSING A BODY OF KNOWLEDGE"; U.S. Ser. No. 09/020,680 entitled "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR"; and U.S. Ser. No. 09/020,679 entitled "COMPUTER SYSTEM AND METHOD FOR ABSTRACTING AND ACCESSING A CHRONOLOGICALLY-ARRANGED COLLECTION OF INFORMATION". Moreover, this application is related to the following co-pending applications which were filed on Dec. 15, 1997 by George Francis DeStefano: U.S. Ser. No. 08/990,370 entitled. "COMPUTER SYSTEM AND METHOD OF MANIPULATING A WINDOW ON A COMPUTER DISPLAY THROUGH COLLISION WITH A POINTER"; and U.S. Ser. No. 08/990,304 entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER". Each of these applications is hereby incorporated by reference herein.

FIELD OF THE INVENTION

The invention is generally related to computer systems and graphical user interface environments therefor. More particularly, the invention is related to display and user access to information in a computer system or the like.

BACKGROUND OF THE INVENTION

Much of the combined knowledge base of the world has and continues to be recorded in written form (e.g., in books), so that others are able to more conveniently access and use such information. With the advent of computer technology, more and more information is now stored in an electronic form and accessed via a computer, rather than via the written page. Nonetheless, regardless of the media used to store information, the information has and continues to be regarded as being essentially one-dimensional—that is, a series of ideas strung together in a sequence of words or pages. Book pages and computer displays are each two-dimensional in nature, and may even provide two dimensional representations of three-dimensional objects. However, the basic structure of a collection of information presented in either case is still for the most part one-dimensional insofar as a person processes the information in a generally linear fashion.

Educational materials in particular tend to utilize a one-dimensional or linear progression to teach users about a particular subject. For example, an educational material may begin with a broad overview about a subject, and then progress sequentially through more detailed discussions of specific topics identified in the overview. Examples and/or problems may also be embedded sequentially within this progression so that, once a user receives detailed information about a particular topic, the user may be able to see an example, or may be required to work a problem, to reinforce the user's understanding of the topic. Many topics often tend to build on the information previously presented to a user in earlier topics so that a user can utilize the earlier information in contrasting and/or noting the similarities between the topics.

One drawback to conventional one-dimensional representations of information, however, is that a collection of information rarely if ever is related solely through a linear relationship. Rather, pieces of information about a given subject may often be linked together based upon a wide variety of contextual relationships, as well as from multiple sources.

For example, a collection of information may be associated with several levels of abstraction that stratify the collection into different categories and/or define predetermined relationships between information within the collection. A level of abstraction typically relates to a particular manner of looking at a given collection of information, also referred to as a body of knowledge. Among other criteria, different levels of abstraction may relate to different comprehension levels, e.g., a basic or summary level vs. an advanced level, or different points of view or ways of looking at or stratifying the information. A collection of information may also be associated within multiple concepts, with specific pieces of information relating to the same general concepts.

Unless a user has a complete understanding not only of the specific information in a body of knowledge, but also of the contextual relationships established within such information, the user likely will not have a full comprehension of the body of knowledge as a whole. On the other hand, given that a wide variety and volume of relationships may be established between information in a body of knowledge, there is a substantial risk that a presenting all of the potential relationships between information in a body of knowledge may actually impede user comprehension. Specifically, a large volume and/or a wide variety of relationships may be too overwhelming to digest absent some direction, e.g., from someone such as a teacher who is more knowledgeable about a particular body of knowledge. In short, a user may often have difficulty separating the relevant relationships in a body of knowledge from the irrelevant relationships.

As a result, a significant need exists, specifically in the area of presenting educational materials, for a manner of presenting not only the information in a body of knowledge, but also the contextual relationships established within the body of knowledge, with sufficient structure and control so that a user is better able to digest such information in a logical and coherent manner.

SUMMARY OF THE INVENTION

The invention addresses these and other problems associated with the prior art by providing a computer system and method of controlling the same in which an abstraction stack is sequenced through a number of predetermined display formats to facilitate user comprehension of a body of knowledge. An abstraction stack is utilized to present information from a body of knowledge in a three-dimensional workspace to facilitate user comprehension and management of both the specific information in the body of knowledge, as well as the contextual relationships of the information within the body of knowledge as a whole. The presentation of the information is therefore shifted from an essentially one-dimensional model to a three-dimensional model that is inherently more intuitive and efficient. As a result, the ability of a user to access, manage and comprehend a body of knowledge, or a specific problem related to that body of knowledge, is significantly enhanced.

Moreover, a number of predetermined display formats are defined for the abstraction stack to permit the presentation of information to a user to be optimized throughout a sequence of predefined steps. This permits an author of a body of knowledge, for example, to present information from the body of knowledge in a logical and structured manner so that a user's attention and focus may be directed to follow a predetermined path through the body of knowledge.

It will therefore be appreciated that, through the use of an abstraction stack that presents information in a three-dimensional workspace, a user benefits from the added comprehension that results from the presentation of the contextual relationships of information in a body of knowledge. However, the presentation of these relationships is controlled via the different display formats for an abstraction stack such that a logical and controlled progression through a body of knowledge may still be obtained. Thus, the risk of a user becoming distracted by focusing on irrelevant matters is often reduced.

Particularly in the area of educational materials, an author has a great deal of flexibility, and more or less is permitted to function as a teacher that charts a specific path through the body of knowledge from a starting point (representing the initial comprehension level of a student) to an intended destination (representing a desirable comprehension level for the student after the student progresses through the sequence of steps). To this extent, the sequence of steps may be considered to function as a component of a lesson plan for a given educational topic. However, it should be appreciated that the principles of the invention may also apply to other types of materials and applications.

The predetermined display formats for an abstraction stack typically specify at least one of a position in the body of knowledge and a lens configuration for the abstraction stack, with each lens configuration specifying at least one lens configured to display at least a portion of the body of knowledge. In the illustrated embodiments, for example, the display format for some steps in a sequence may define a target location in a body of knowledge so that a specific information element relevant to a particular concept, and at an appropriate level of abstraction, is presented at an appropriate place in a sequence. In addition, the display format for some steps may specify a lens configuration that determines a number, configuration and/or arrangement of lenses sufficient to present a user with not only a primary concept at a primary level of abstraction, but also with related concept; and/or alternate presentations of a concept at other levels of abstraction so that the contextual relationships for specific concepts may also be viewed and digested by a user concurrently with the primary concept. It will be appreciated that, as discussed below, a wide variety of other display format configurations may also be utilized consistent with the invention.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described embodiments of the invention.

DETAILED DESCRIPTION

Hardware Environment

Figure 1:
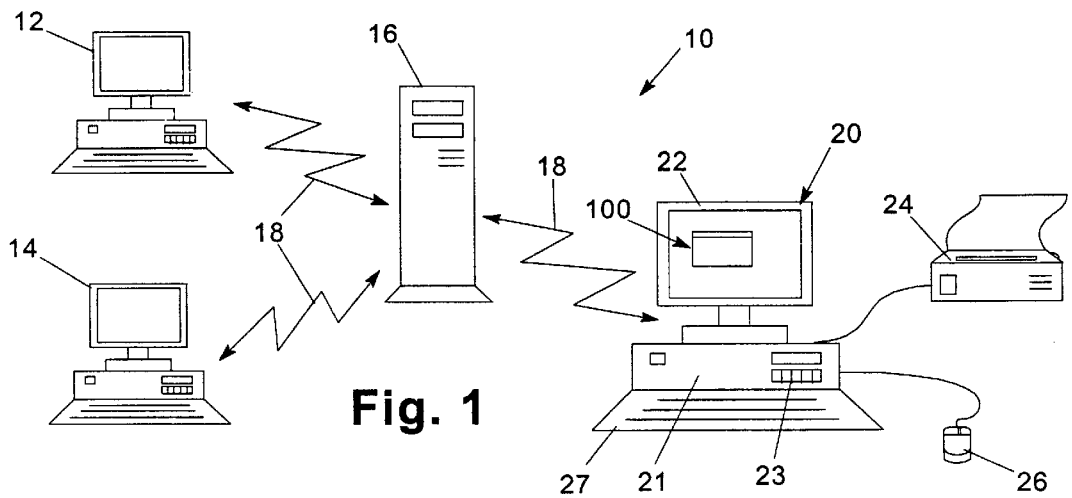
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22; storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

Computer display 22 may include any known manner of visually presenting information to a user. For example, computer display 22 may be a video monitor, e.g., a cathode-ray tube (CRT), a liquid crystal display (LCD), or a projection display, among others. In addition, other types of computer displays, including two dimensional displays that simulate three dimensions (e.g., virtual reality headsets), as well as three dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user initerface devices may also be used in the alternative.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
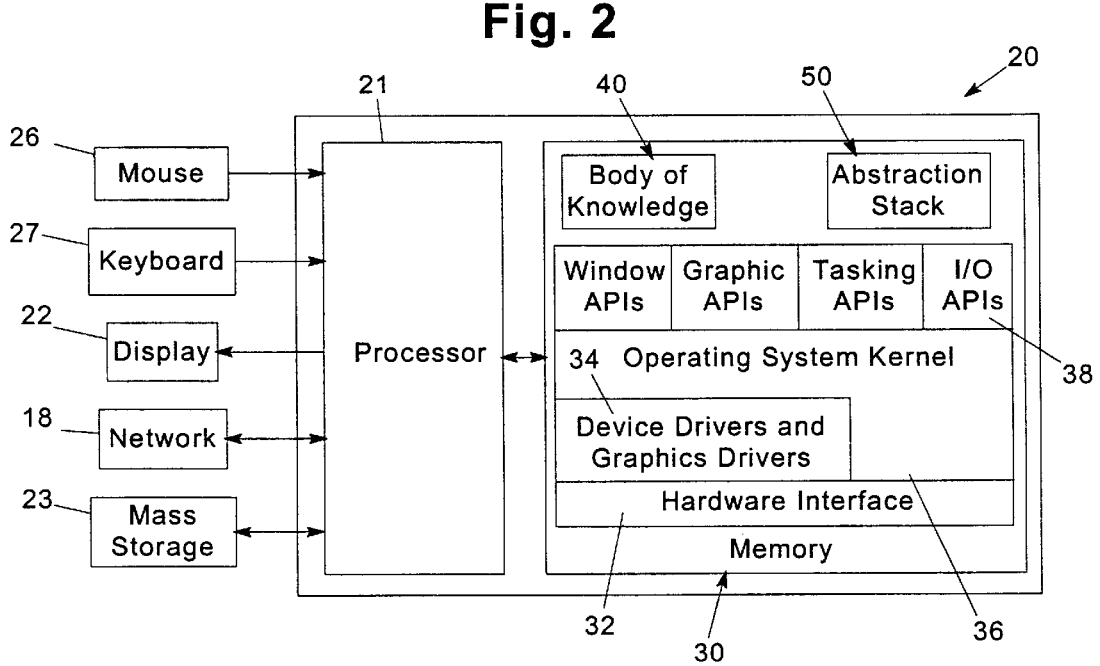
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 30 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A number of system computer programs are stored in memory 30, including hardware interface program code 32, device and graphics drivers 34, operating system kernel 36, and various application programming interfaces (APIs) 38, e.g., Window APIs, Graphic APIs, Tasking APIs and Input/Output APIs, among others. It should be appreciated that the configuration and operation of each of these system programs typically depends upon the particular computer hardware used, and is in general well understood in the art. For example, any of a number of operating systems may be used, e.g., OS/400 for the AS/400 midrange computer, Windows 95 or Windows NT for a PC system, MacOS for the Macintosh computer, or any of the number of variations of UNIX, among others.

Any number of computer software applications may execute on computer system 10 by utilizing the system program code provided therein. Moreover, memory 30 may also store data utilized by various applications or system program code. For example, FIG. 2 illustrates a body of knowledge 40 and an abstraction stack 50, each of which are discussed in greater detail below.

It should be appreciated that the system program code represented at 32-38, body of knowledge 40, and abstraction stack 50 may be stored on network 18 or mass storage 23 prior to start-up. In addition, each may have various components that are resident at different times in any of memory 30, mass storage 23, network 18, or within registers and/or caches in processor 21 (e.g., during execution thereof).

It should also be appreciated that other software environments may be utilized in the alternative.

Abstraction-Stack with Sequence of Predetermined Display Formats

As discussed above, various embodiments of the invention permit a controlled progression through a sequence of abstraction stack display formats to direct a user's attention to a specific presentation of information in a controlled and logical order. Prior to a detailed discussion of this feature, however, a brief introduction to basic abstraction stack concepts is provided.

Abstraction Stack Concepts and Example Body of Knowledge

A number of the hereinafter described embodiments utilize an abstraction stack to represent information from a body of knowledge (BOK) stratified into a plurality of levels of abstraction. The specific details regarding the construction, implementation, and use of an abstraction stack are generally disclosed principally in the herein incorporated applications entitled "COMPUTER SYSTEM AND METHOD FOR AUTHORING, ABSTRACTING AND ACCESSING A BODY OF KNOWLEDGE"; "COMPUTER SYSTEM, METHOD AND USER INTERFACE COMPONENTS FOR ABSTRACTING AND ACCESSING A BODY OF KNOWLEDGE"; "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR"; and "COMPUTER SYSTEM AND METHOD FOR CONTROLLING THE SAME UTILIZING LOGICALLY-TYPED CONCEPT HIGHLIGHTING". The reader is therefore directed to these applications for a more detailed understanding of the specific components discussed herein.

Figure 3:
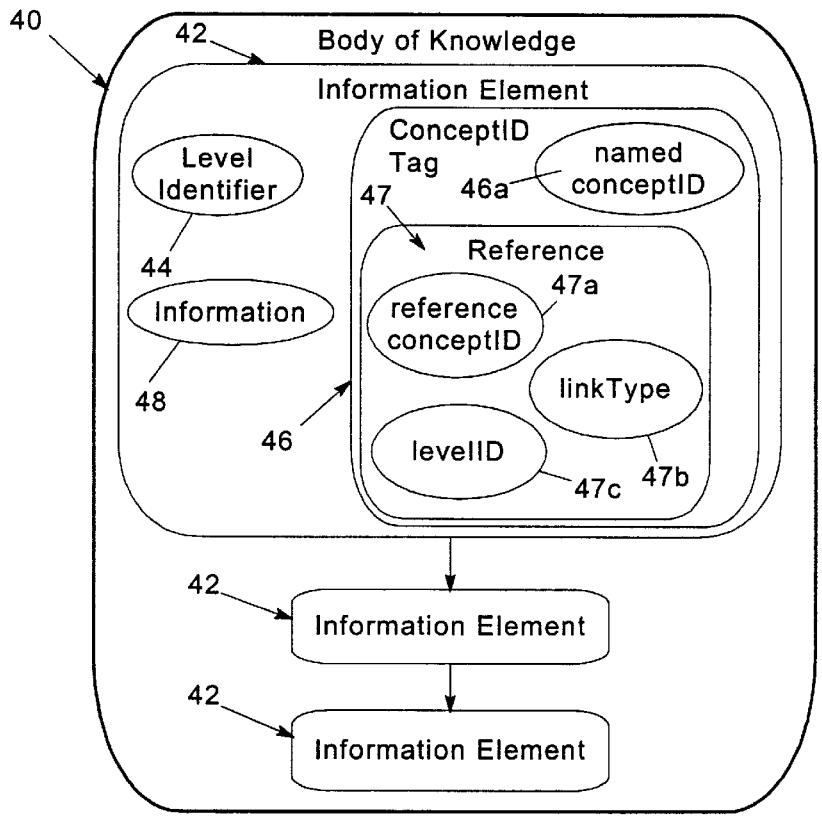
FIG. 3 is a block diagram of the software components in the body of knowledge of FIG. 2.

For example, FIG. 3 illustrates one manner of maintaining a body of knowledge 40 that utilizes an ordered list of information elements 42. An information element typically represents a segment of data that conveys information related to one or more levels of abstraction in a body of knowledge.

Each information element includes a level identifier 44, one or more concept identifier tags 46 and information 48. Level identifier 44 generally represents an author's designation of which if any levels of abstraction are related to the information in the information element, and thus, whether the information element is suitable for presentation in conjunction with the presentation of a particular level of abstraction. The level identifier can have a number of possible values, including a null value, a single level value, a list of level values, a range of level values, a list of ranges of level values, an upper level boundary, a lower level boundary, or any combination thereof.

A level of abstraction typically represents a particular manner of looking at a given body of knowledge, and may be based on numerous criteria. Generally, any abstraction stack may often be considered as addressing audiences with multiple levels of ability and interest. The audiences in some instances are made up of separate individuals. In other instances, a single individual's ability and interest can vary over time so that a single individual represents multiple audiences. As a result, the manner in which levels of abstraction are established for a body of knowledge can determine how different presentations can be tailored to specific audiences.

Each concept identifier tag 46 generally represents an author's identification of an information element in terms of one or more named concepts. Named concepts may be associated with one another based upon a number of different logically-typed linkages. Each concept identifier tag 46 may therefore include a named concept identifier 46a and one or more references 47, each of which includes one or more of a reference concept identifier 47a, a link type 47b and a level identifier 47c. The use of logic-typed linking is described in greater detail in the aforementioned incorporated application entitled "COMPUTER SYSTEM AND METHOD FOR CONTROLLING THE SAME UTILIZING LOGICALLY-TYPED CONCEPT HIGHLIGHTING".

Information 48 generally represents the actual data in the information element that is relevant to the body of knowledge. The information may be as small as a bit (e.g., a flag), or may include an unlimited amount and variety of data, including text data, image data, multimedia data such as audio and/or video data, executable data, etc. As will also become apparent below, information 48 may also include other information elements, whereby nested information elements are supported.

Body of knowledge 40 may be created and/or maintained in a number of manners. For example, a body of knowledge may be stored in one or more tag-delimited text documents, e.g., using a modified Hypertext Markup Language (HTML) format.

As an example, one suitable format of a body of knowledge document that will be used hereinafter to describe the various features of the invention is illustrated below in Table I:

TABLE I

Example HTML Document

| | |
|---|---|
| 1 | <HTML> |
| 2 | <HEAD> |
| 3 | <TITLE>Energy and motion</TITLE> |
| 4 | </HEAD> |
| 5 | <BODY> |
| 6 | <H1>Energy and motion</H1> |
| 7 | <P>Everyone knows you have to have energy to move, but that's not all you need. *** |
| 8 | <infoel lvl=one cid=mobility>We put wheels on things to make them mobile.</infoel> *** |
| 9 | <infoel lvl=two cid=mobility>Automobiles have wheels and engines, so they can move themselves...<img src="auto.gif" alt="A car" align=right> |
| 10 | <infoel lvl=three cid=leverage>Wheels, with their spokes, and the axle they turn about are a special kind of lever...</infoel> *** |
| 11 | </infoel> *** |
| 12 | <infoel lvl=two cid=mobility>Airplanes have engines and wings, so they can move themselves...<img src="plane.gif" alt="An airplane" align=right> |
| 13 | <u>jet</u> or some sort of <u>internal combustion</u> engine...</infoel> *** |
| 14 | </infoel> *** |
| 15 | <infoel lvl=two cid=mobility>People have engines and legs, so they can move themselves...<img src="person.gif" alt="A person" align=right> |
| 16 | <infoel lvl=three cid=engines>...People's engines are not like the engines in machines people build...</infoel> |
| 17 | </infoel> |
| 18 | </BODY> |
| 19 | </HTML> |

While the above body of knowledge is shown in an HTML format for illustrative purposes, it should be appreciated that any number of data storage formats may be used consistent with the invention. For example, the body of knowledge may be input into the data structure illustrated in FIG. 3 as described in the various herein incorporated applications.

The example body of knowledge defines three levels beyond a "null" level, denoted by level identifiers (lvl's) "one", "two" and "three". Three named concepts are defined using concept identifiers (cid's) for "mobility", "leverage" and "engines".

Figure 4:
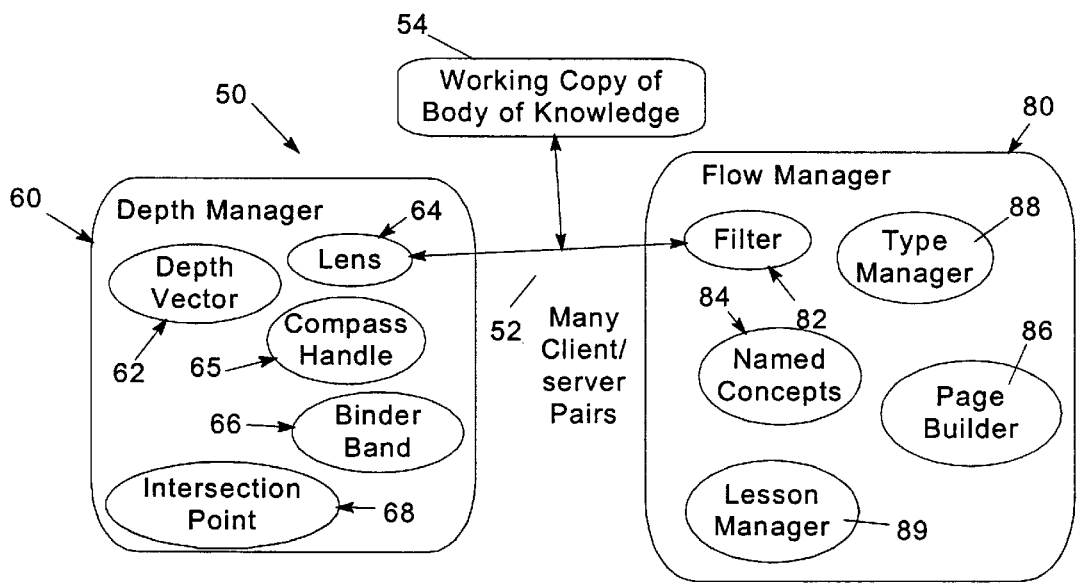
FIG. 4 is a block diagram of the software components in the abstraction stack of FIG. 2.

As discussed above, an abstraction stack is utilized to access and/or manipulate the information stored in a body of knowledge, e.g., body of knowledge 40. One suitable implementation of an abstraction stack is illustrated at 50 in FIG. 4. The abstraction stack includes two primary components, a depth manager 60 and a flow manager 80. Depth manager 60 generally maintains the data structure of the abstraction stack and handles rendering of the abstraction stack on a computer display. Flow manager 80, on the other hand, generally handles the user interaction with the data structure to modify the manner in which the body of knowledge is displayed within the abstraction stack's lenses.

Depth manager 60 generally handles the data structure of the abstraction stack as well as rendering of the abstraction stack on a computer display. The data structure of the abstraction stack includes a plurality of objects representing different abstraction stack components. These components generally include a depth vector 62, a set of lenses 64, compass handles 65, binder bands 66 and intersection points 68, each of which is discussed in greater detail in the herein incorporated applications.

Flow manager 80 generally handles the user interface with the abstraction stack data structure to modify how the body of knowledge is displayed within the abstraction stack's lenses, including handling information how to the various lenses displayed for the abstraction stack. Flow manager 80 is coupled to depth manager 60 through a number of client/server pairs shown at 52. The client/server pairs 52 couple together lenses with filters and a working copy of the body of knowledge, and generally function to control the flow of information from the body of knowledge into a lens.

Flow manager 80 also includes a number of objects that are utilized to handle user interaction with the abstraction stack. For example, flow manager 80 utilizes one or more filter objects 82 to define the manner in which information is displayed in suspended lenses. A list of available named concepts 84 is also maintained by flow manager 80 to determine when to visually link together information that is related to a particular concept when information from different levels of abstraction is concurrently displayed.

In addition, a page builder object 86 is used in flow manager 80 to control how an abstraction stack is viewed in a computer display. The page builder, which may be similar in many respects to a component of a conventional web browser, includes a number of type managers 88 that are used to handle different types of information from a body of knowledge. For example, separate type managers may be provided for handling text information, graphical information, audio information, video information, animation information, and method information, among others. To this extent, a separate working copy 54 of the body of knowledge is used by page builder 86 for each lens-filter pair during viewing so that appropriate links to different types of information (especially executable methods) may be maintained.

Figure 5:
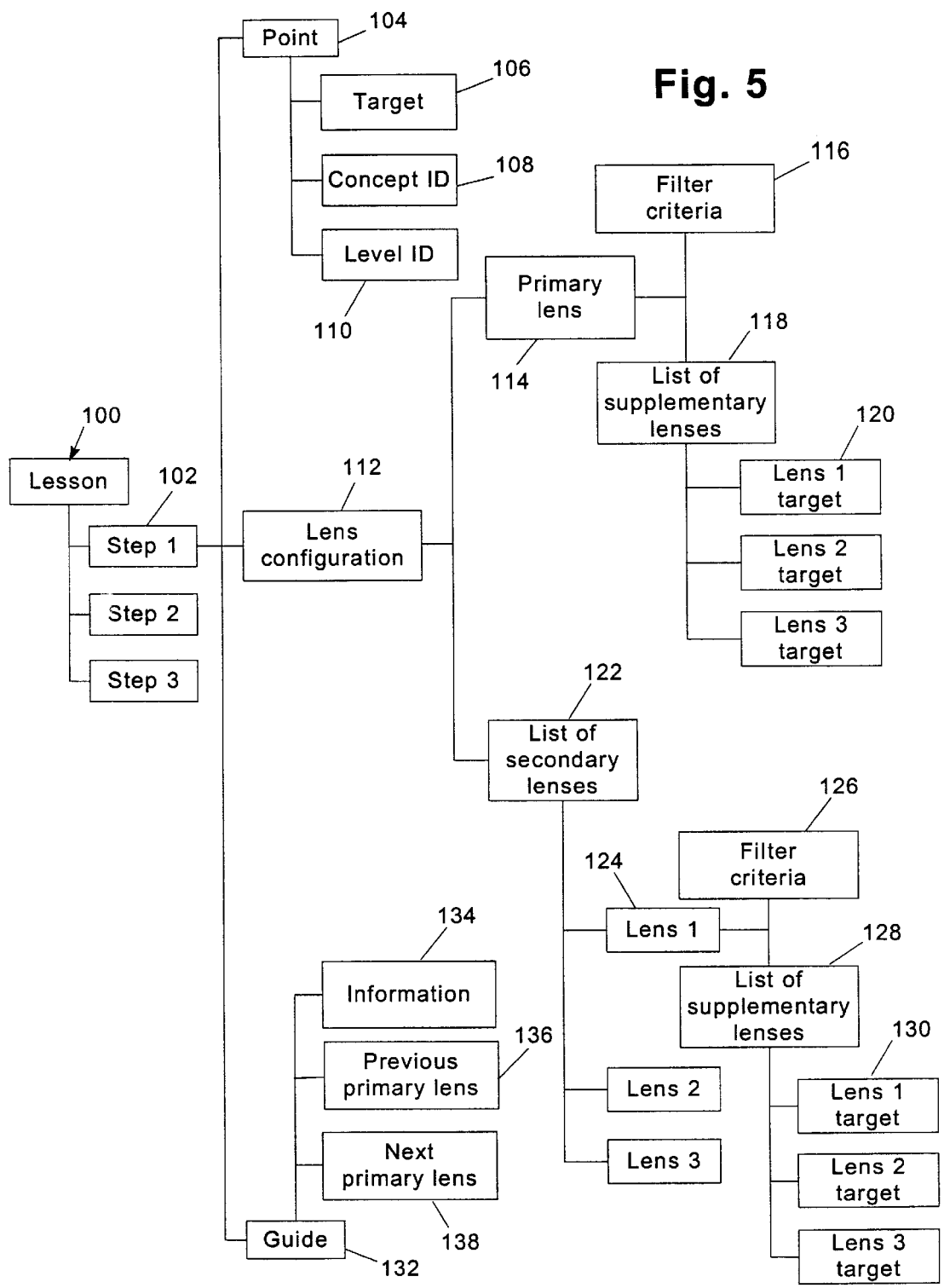
FIG. 5 is a block diagram of a lesson data structure used by the abstraction stack of FIG. 4.

Flow manager 80 also uses a lesson manager 89 that maintains a lesson data structure that specifies how an abstraction stack is to be configured to present the controlled sequence of representations of the body of knowledge to the user. The lesson data structure is illustrated in greater detail at 100 in FIG. 5.

A lesson generally relates to a sequence of steps that control the display format of an abstraction stack as a user is led from a starting point to a destination in a body of knowledge. Each step defines a predetermined display format for the abstraction at that step, which typically permits the presentation of information to a user to be optimized throughout the sequence of steps. This permits an author of a body of knowledge, for example, to present information from the body of knowledge in a logical and structured manner so that a user's attention and focus may be directed to follow a predetermined path through the body of knowledge.

Data structure 100 therefore includes a plurality of steps 102, each of which including at least one of a point data structure 104, a lens configuration data structure 112 and a guide data structure 132. It should be appreciated that one or more of these data structures may be omitted from any or all steps in a lesson.

Point data structure 104 is used to identify a specific information element in the body of knowledge to which a user's primary focus should be drawn for a particular step. A point includes a target location 106, representing the position of the specific information element in the body of knowledge, as well as a concept identifier 108 and a level identifier 110 selected from the available concept and level identifiers associated with the specific information element (discussed in greater detail below).

Lens configuration data structure 112 defines the desired layout, configuration and/or arrangement of lenses in the abstraction stack for the particular step. The lens configuration may include a primary lens data structure 114 and a filter criteria or configuration 116 therefor that is used to filter information elements from the body of knowledge based upon the levels of abstraction associated therewith (discussed in greater detail below). The lens configuration may also include a list 118 of supplementary lenses, each of which includes a target location 120. As discussed in greater detail below, a supplementary lens inherits the filter criteria of its supplemented lens (here the primary lens), and thus is disposed at the same depth along the abstraction axis. However, a supplementary lens has a different target location in the body of knowledge.

The lens configuration may also include a list 122 of secondary lenses 124. As also discussed in greater detail below, a secondary lens utilizes a separate filter configuration from the primary lens (and thus is disposed it a different depth along the abstraction axis). A secondary lens, however, is related to the primary lens via coordinated scrolling, and thus, a secondary lens inherits the target location specified in point 104. As a result, each lens 124 includes a filter criteria or configuration 126. Each lens 124 may also include its own list 128 of supplementary lenses 130, which are related to a secondary lens in the same manner as the supplementary lenses that supplement a primary lens.

Guide data structure 132 includes a set of information 134 that is used to describe the step in a separate guide lens that is displayed adjacent an abstraction stack, and that preferably includes the user interface components that a user may select to sequence through the steps in a lesson. In the alternative, guide information may be integrated into a body of knowledge and designated with a separate "guide" level of abstraction, and thus also may be displayed in a separate lens in the abstraction stack.

Guide data structure 132 may also include identifications 136, 138 of the primary lenses for the previous and/or next steps in the sequence. These identifications may be used to denote where a user's attention will be directed in the previous and/or next steps in a sequence. Moreover, it should be appreciated that the first step in a sequence typically will not identify a previous primary lens, nor will the last step identify a next primary lens.

It should be appreciated that other data structures may be used in the alternative. For example, to conserve space and/or speed processing, it may be desirable to store only the changes between the display formats defined by the steps, rather than the full definitions each display format in the lesson.

Figure 6:
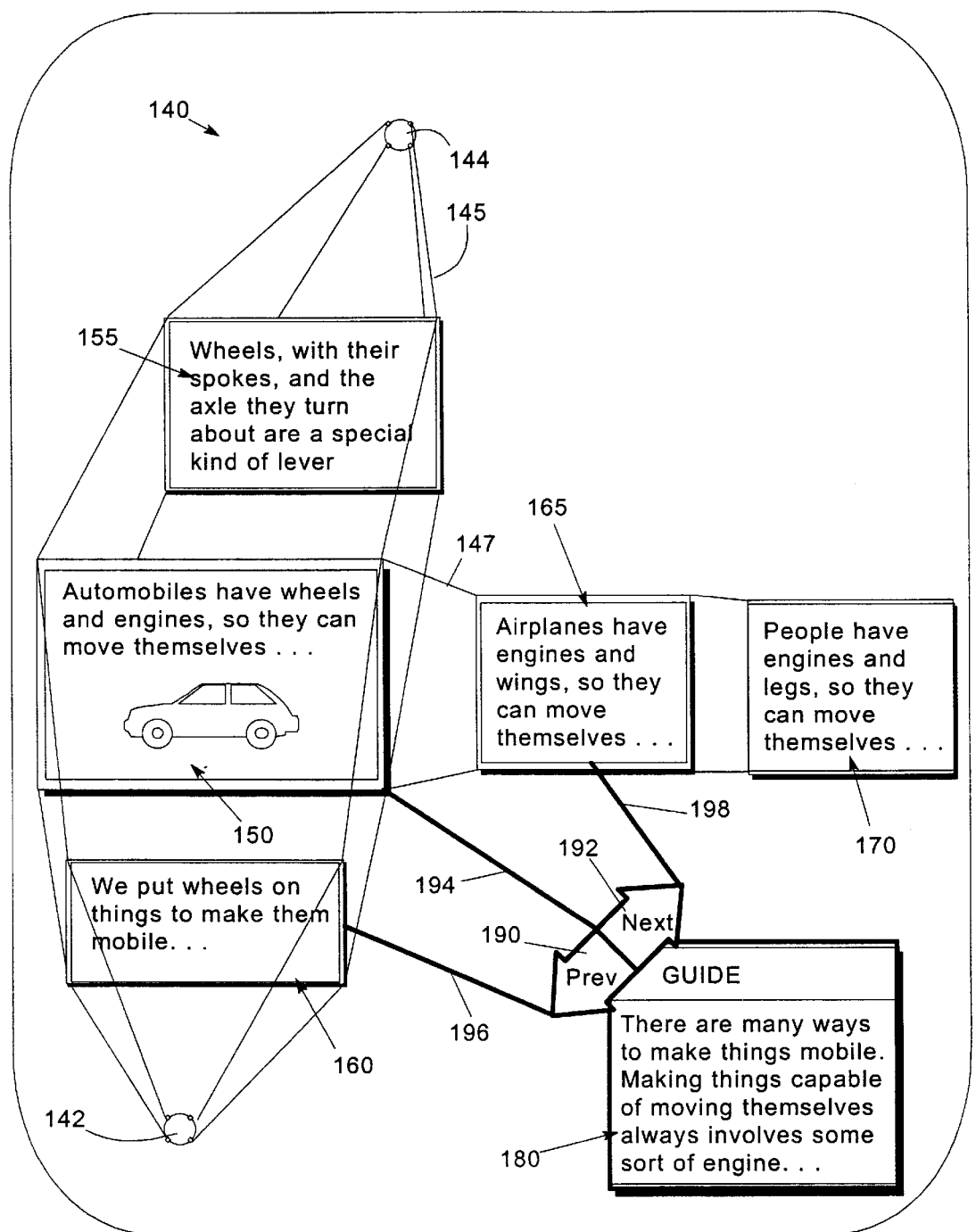
FIG. 6 is a block diagram of a computer display illustrating a first representation of the abstraction stack of FIG. 4, and associated with a first step in a lesson.

Turning briefly now to FIG. 6, which provides a representation of an abstraction stack 140 consistent with the invention, an abstraction stack generally provides a visual manner of organizing multiple levels of abstraction. Each level of abstraction in a body of knowledge is typically represented in an abstraction stack by a focal plane organized along a common depth vector, or abstraction axis, extending generally perpendicular thereto. The focal planes are organized along the depth vector based upon the manner of categorizing the levels of abstraction. For example, if levels of abstraction relate to different levels of detail, the focal planes may be organized sequentially based upon the relative levels of detail for their associated levels of abstraction.

An abstraction stack functions to display information from one or more focal planes in such a manner that the different focal planes are organized in a three-dimensional workspace such that the relative arrangement of the focal planes is readily apparent therefrom. Focal planes are generally handled as two-dimensional virtual constructs, with the depth vector upon which focal planes are organized representing the third dimension of the stack. As a result, display of an abstraction stack on a two-dimensional display such as a video monitor often requires three-dimensional modeling techniques to be utilized to provide a three-dimensional rendering of an abstraction stack. It should be appreciated that a depth vector is principally an organizational construct, and may or may not be displayed on a computer display.

One type of object in an abstraction stack is a lens, e.g., lenses 150, 155, 160, 165, and 170, which typically serves as a point of attachment and focus point along the abstraction stack for stack manipulation and content. A lens is typically used to display the information from one or more levels of abstraction. In addition, a lens is typically represented in much the same manner as a GUI window, with controls such as resizing handles, minimizing handles, scroll bars, etc. used to modify the appearance and content displayed in the lens, if desired.

Another type of abstraction stack object data structure is a compass handle (e.g., handles 142 and 144), which are typically located at an end of a depth vector of an abstraction stack. A compass handle typically functions as an endpoint of the abstraction stack, and may function as a focal point for manipulation of and access to a minimized or maximized abstraction stack. In addition, a compass handle may be used as a point of attachment to other related abstraction stacks for a particular body of knowledge.

Another object in the abstraction stack data structure is a binder band, which provides one manner of visually representing the hierarchical arrangement of levels of abstraction via visually connecting other objects displayed along a depth vector of an abstraction stack. One subclass of a binder band is a shaft band (e.g., shaft band 145), which generally links together objects associated with different levels of abstraction in a body of knowledge. Another subclass of a binder band is a strata band (e.g., strata band 147), which generally links together objects associated with the same level of abstraction in a body of knowledge (e.g., lenses 150, 165 and 170). A binder band is typically represented by one or more connecting elements that extend between two other displayed objects. For example, in one embodiment, a binder band may be represented by four lines extending between corresponding corners of two objects. Other numbers of lines, as well as other forms of connecting elements, may be used to represent a binder band in the alternative.

Other abstraction stack objects, discussed in greater detail in the herein incorporated applications, may also be provide in abstraction stack 140 consistent with the invention. The reader is therefore directed to such applications for a better understanding of the implementation and use of such objects.

Lenses, which are much like windows in common GUI environments, may be created and manipulated to modify the presentation of information from a body of knowledge. Lenses differ from windows in the manner in which they are related to one another. That is, lenses provide coordinated views of a body of knowledge at different levels of abstraction and are visually manifested in a three-dimensional representation that reflects the stratification of the body of knowledge. Lenses are typically peers, owned by the depth manager responsible for the three-dimensional space in which they appear. Windows are related in a parent-child or master-owner relationship, and are visually represented with randomly determined three-dimensional aspects that reflect no underlying organization of the information they convey within their viewing areas.

For example, lenses may be related through a coordinated scrolling relationship, whereby multiple lenses may be coordinated to display different views of essentially the same concepts in a body of knowledge, with coordinated scrolling provided to ensure that the lenses track one another as lenses are scrolled to display other concepts in a body of knowledge. To this extent, lenses in an abstraction stack are typically grouped into one or more lens sets. Each lens set typically has associated therewith a current location or position in the body of knowledge that is consistent across each lens in the lens set. Each lens, however, may also have start and end boundaries, referred to herein as shallow and deep bounds, that define at the extent of a "window" or segment of information from the body of knowledge that is displayed in a particular lens. By maintaining the current position for the lens set between the shallow and deep bounds of each lens in the lens set, the lenses are permitted to track one another during scrolling operations.

Lenses in a coordinated scrolling lens set are typically, but not necessarily, disposed along the depth vector and connected by shaft bands such as shaft bands 145. Lenses that are disposed along a depth vector may be considered as depth vector lenses, and are typically either primary or secondary lenses. Primary and secondary lenses are associated in a common lens set, with the only difference therebetween being that a primary lens is the focus of a user's interaction with the abstraction stack in navigation of the body of knowledge, while a secondary lens is typically modified automatically in response to user operations on the primary lens. A secondary lens typically displays the same concepts as a primary lens, albeit with an independent filter configuration that provides an alternate view of essentially the same information in the body of knowledge. In addition, a secondary lens may be activated to become the primary lens, whereby the prior primary lens then becomes a secondary lens. As an example, lenses 150, 155 and 160 are associated with one another in a lens set, with lens 150 operating as a primary lens and lenses 155 and 160 operating as secondary lenses.

Lenses may also be related through an inherited filter relationship, whereby one lens, designated a supplementary lens, inherits the filter characteristics of another lens, designated a supplemented lens. A supplementary lens provides a view of information at an alternate point within the body of knowledge to that of the lens supplemented thereby. Navigation with a supplementary lens is independent of its supplemented lens, although the filter configuration is typically identical to that of its supplemented lens.

Supplementary lenses are typically disposed at the same depth along the depth vector as their associated supplemented lens, but spaced apart from the supplemented lens within the same plane. Supplementary lenses may also be members of a lens set of other supplementary lenses such that a coordinated scrolling relationship is provided therebetween. For example, lenses 165 and 170 ire supplementary lenses inheriting the filter configuration of supplemented lens 150.

Each lens has associated therewith a filter criteria that defines how the lens displays information from the body of knowledge. Specifically, a filter for a lens typically defines whether a lens passes or blocks information elements from each level of abstraction. In addition, for each level of abstraction passed by the filter, the filter defines how the information elements therefrom are transformed, if at all, when displayed in the lens.

The types of filters that may be useful in an abstraction stack typically varies depending upon the manner in which a body of knowledge is stratified into levels of abstraction, which may be referred to as an abstraction scheme. A body of knowledge may be represented by one abstraction scheme or by multiple abstraction schemes, with one or more of such schemes specifically defined by an author or developer, and/or with one or more of such schemes inherently defined, e.g., based upon standard document components or data types.

Various user manipulations of lenses may be performed. For example, as discussed above, it may be desirable to provide coordinated scrolling between lenses in a lens set. In addition, it may also be possible to link together information elements relating to named concepts, e.g., so that movement of a link pointer over an information element directed to a specific named concept results in the highlighting of other displayed information elements matching the named concept, as well as other named concepts referenced by a given information element (discussed in greater detail in the aforementioned incorporated application entitled "COMPUTER SYSTEM AND METHOD FOR CONTROLLING THE SAME UTILIZING LOGICALLY-TYPED CONCEPT HIGHLIGHTING").

An outrider guide lens 180 is also provided to display the guide information specified for a given step. The guide lens 180 is used as a point of attachment for a pair of user interface components, "prev" button 190 and "next" button 192, which are respectively used to initiate transitions to previous and next steps in the lesson in response to user selection thereof. In the alternative, buttons 190 and 192 may be disposed elsewhere on a computer display.

Guide lens 180 is linked to the abstraction stack via one or more guide bands, including a current guide band 194, a previous guide band 196 and a next guide band 198. The current guide band couples the guide lens to the current primary lens for the step. The previous guide band 196 couples the guide lens to the primary lens for the previous step in the lesson (unless the first step is displayed). The next guide band 198 couples the guide lens to the primary lens for the next step in the lesson (unless the last step is displayed). The previous and next guide bands are shown as terminating proximate the tips of arrow representations for buttons 190, 192 to reinforce what the result of depressing a button will be. It should be appreciated that other manners of linking the guide lens and/or user interface components to the abstraction stack (e.g., color coordinating the buttons and primary lenses, among others) may be used in the alternative.

Lenses and/or lens groups may also be represented in minimized or maximized representations. A minor lens typically is utilized to represent a minimized lens, and is typically arbitrarily small so that its minimized representation is apparent to a user. A maximized lens is typically represented by a prime lens, with a collapsed abstraction stack typically displayed concurrently with a prime lens to maintain a visual relationship of the prime lens within the abstraction stack as a whole.

User interaction with the abstraction stack is principally handled by a pointer (not shown in FIG. 6) that is manipulated by one or more user interface devices such as a mouse, a trackball, a keyboard, a touch pad, etc. A pointer may be placed into one of several modes, and may also be used in such operations as switching focus between lenses, highlighting information for cut and paste operations, etc. Other uses of the pointer include various conventional pointer-based actions, such as resizing, moving, closing and similar window operations, selection of menu entries, and selection of buttons, among others.

Additional user interface controls and operations may be implemented in an abstraction stack consistent with the invention. For example, a lens may include various conventional GUI window controls such as a close button, a minimize button, a maximize button, a title bar, resizing handles, scroll bars, drop-down menus, toolbar buttons, etc. A user may also be permitted to select a binder band (e.g., through single or double-clicking on the binder band) to open any adjacent minor lenses thereto, as well as optionally close any other lenses in the lens set. Lenses may also be maximized (e.g., through selection of a maximize button thereon or double-clicking on the title bar thereof), resulting in the display being switched to a prime lens view where the lens substantially fills the computer display, with only a collapsed representation of the remainder of the abstraction stack displayed.

Individual lenses in an expanded abstraction stack may also be manipulated by a user as desired. For example, lenses may be selected to control which lens is designated the primary lens for receiving user input. In addition, movement and/or resizing of lenses may be performed. Movement or resizing of a lens in a lens group or set typically modifies only that lens, although group movement and resizing operations may also be supported. However, even when a lens is resized or moved, the location of the lens along the depth vector relative to other lenses is preferably maintained so that the contextual relationship therebetween is also maintained. The position along the depth vector for a lens may be varied, but preferably not in such a manner that a lens is permitted to switch relative positions with another lens on the stack.

Movement or resizing of a lens may be performed in a number of manners consistent with the invention. For example, similar to conventional GUI windows, a lens may be moved by dragging its title bar or by using arrow keys when in a predetermined mode. Resizing of a lens typically may be performed using conventional resizing handles (e.g., by dragging the boundaries of the lens).

More preferably, however, various alternate movement mechanisms may be used in addition to and/or in lieu of conventional mechanisms. One suitable manner of moving or resizing a lens is through collision of pointer with a boundary of the lens when the pointer is in a collision resizing or movement manipulation mode. With this feature, which is the subject of the aforementioned incorporated application entitled "COMPUTER SYSTEM AND METHOD OF MANIPULATING A WINDOW ON A COMPUTER DISPLAY THROUGH COLLISION WITH A POINTER", movement of a pointer along a first vector moves a boundary segment of a lens along a second vector if it is determined that the first vector intersects that boundary segment. In a movement mode, the boundary segment is moved in conjunction with all other boundary segments to effectively move the lens. In a resizing mode, other boundary segments remain fixed to effectively resize the lens. The pointer may be defined to have a single position from which the first vector extends, or in the alternative, a proximity range may be defined around the pointer, with a boundary thereof used to test for collisions with a boundary segment of a lens.

This type of pointer manipulation, which is also referred to as a "bumper-jumper" operation, typically results in the appearance of a pointer "bumping" or "pushing" a lens as the pointer collides with the lens. The mode can be selectively enabled or disabled, including a temporary enabling or disabling operation (e.g., by holding down a control key during pointer movement) that permits a user to quickly and selectively "bump" or "jump" over any given boundary as desired. In addition, collision may be selectively detected only when contacting a boundary segment from outside a lens, and/or only when contacting a boundary segment while within the boundary of a lens.

Another suitable manner of moving or resizing a lens that may be used in lieu of or in conjunction with collision manipulation is that of proximity manipulation, such as is described in detail in the aforementioned incorporated application entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER". When in a proximity manipulation mode, lenses within a predetermined proximity range disposed around a proximity pointer may be resized or moved as a group in response to user manipulation of the pointer, thereby permitting faster manipulation of multiple objects at once.

It should be appreciated that other variations disclosed in the herein incorporated applications may also be implemented consistent with the invention. In addition, other manners of manipulating the lenses will be apparent to one of ordinary skill in the art. For example, given that a body of knowledge may be represented in a tag-delimited format such as HTML, it should also be appreciated that hypertext links and the like may be embedded in the body of knowledge such that a user can navigate to predetermined locations in the same or different lenses specified in the embedded links simply by selecting those links. Links may also be associated with particular locations in the body of knowledge, so that each lens in a lens set is scrolled in a coordinated fashion to display its particular representation of that location in the body of knowledge. Other user-coordinated operations may also be performed on the abstraction stack consistent with the invention.

Abstraction Stack Configuration and Initialization

Figure 7:
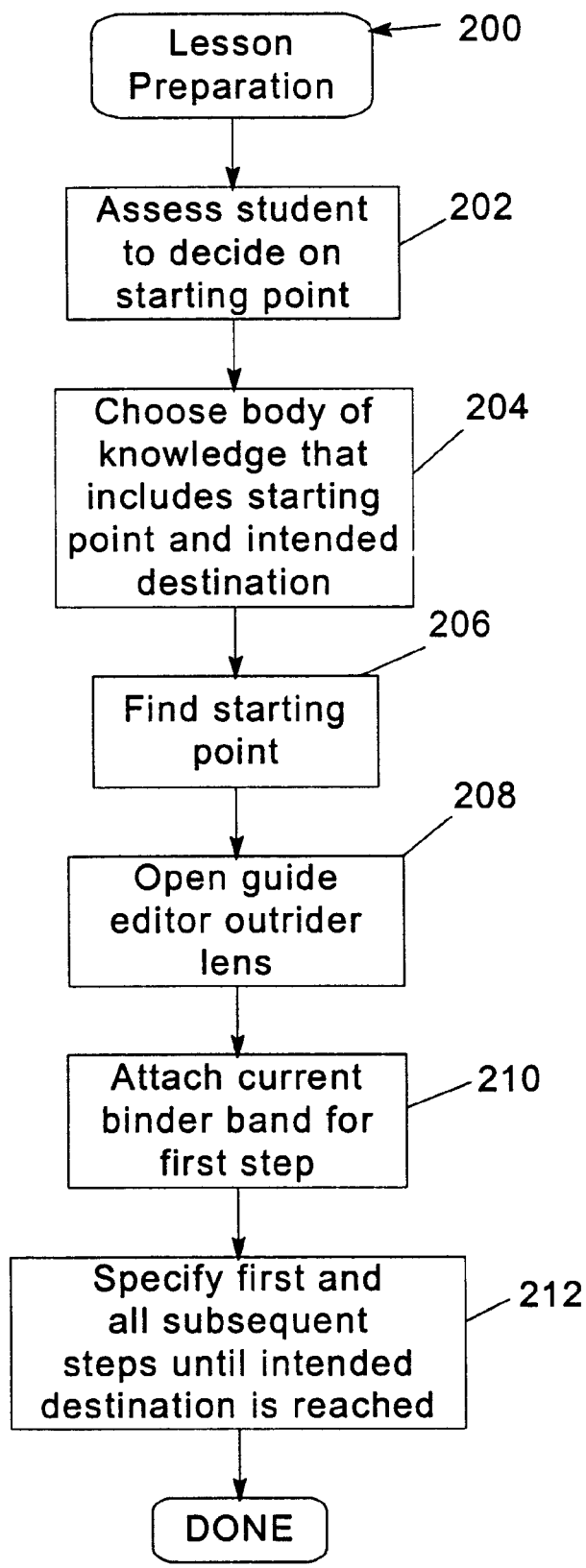
FIG. 7 is a flowchart illustrating a lesson preparation process consistent with the invention.

Configuration and initialization of an abstraction stack consistent with the invention includes the creation of a lesson with multiple steps that each define a predetermined display format for the abstraction stack. FIG. 7, for example, illustrates an exemplary lesson preparation process 200 through which an author of a body of knowledge and/or a specific lesson would proceed through to configure a sequence of steps for charting a path through a body of knowledge. It should be appreciated that this process may be performed, for example, using an abstraction stack as discussed herein along with additional user interface components tailored to assist in the creation of a lesson plan.

Generally, preparation of a lesson begins in block 202 with an assessment of the ability and skill of a student or other intended audience to determine a starting point for the lesson. Next, in block 204 the author chooses an appropriate body of knowledge that includes information suitable for the starting point, as well as the intended destination for the lesson.

For example, for the example body of knowledge of Table I, it may be desirable to develop a lesson that leads a student to a destination where the student has an understanding that people, like the machines they make, are fueled by energy from the sun. Thus, the starting point may be related to a person having only a basic understanding of energy and motion. A lesson plan may be created that begins with an overview of energy and motion, then proceeds through specific examples of types of machines (e.g., automobiles and airplanes, etc.) and then compares and contrasts the examples to people so that a student may obtain an understanding of the similarities and differences between machines and people. At the desired destination, the student may have viewed the overview and the examples, and may be provided with a summary to reinforce what he or she has learned.

Returning to FIG. 7, in block 206 the starting point is located in the body of knowledge. For example, this may be performed by opening a default abstraction stack for the body of knowledge, then locating the particular location of the starting point therein. Next, in block 208 a guide editor outrider lens (which is similar in configuration to a guide outrider lens, except that it permits guide information to be entered into the lens by the author) is opened.

Next, in block 210 the author attaches a current binder band to a lens in the abstraction stack to designate the primary lens for the first step in the lesson. This may be performed, for example, through a drag-and-drop interface, or in other manners known in the art.

Next, in block 212, the first and all subsequent steps in the lesson are specified by the author until such time as the intended destination is reached. Upon completion of block 212, the process is complete.

Figure 8:
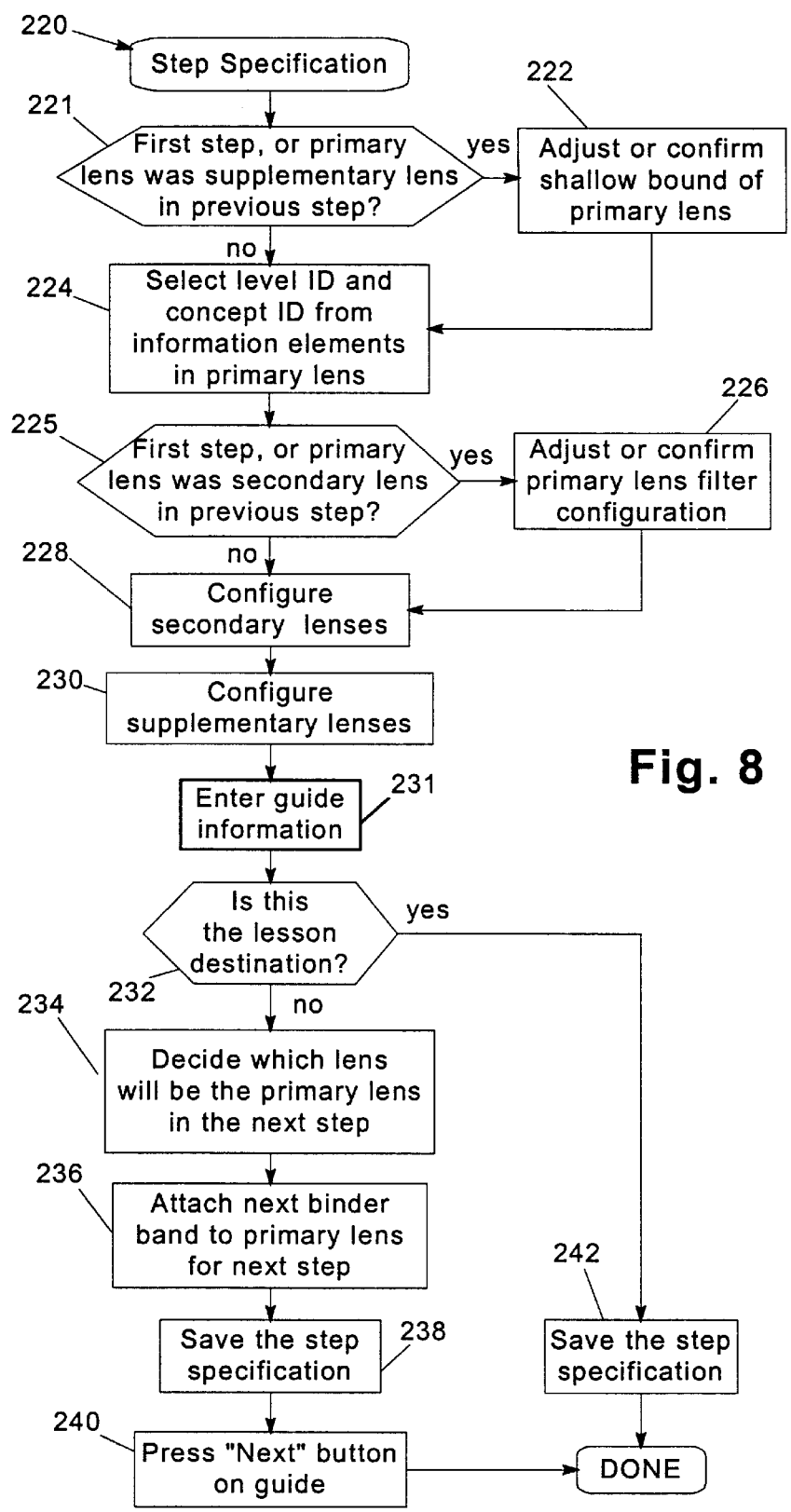
FIG. 8 is a flowchart illustrating a step specification process consistent with the invention.

By specifying each step, the display format for the abstraction stack at each step is defined in the manner described below. FIG. 8 illustrates, for example, one suitable step specification process 220 that may be used to specify a step in the lesson. Specification of a step begins at block 221 by determining whether the step is a first step in the lesson, or whether the primary lens selected by the user for the step was a supplementary lens in the previous step. If so, control passes to block 222 to permit the author to adjust or confirm the shallow bound of the primary lens to set the target location for the step (which is stored in the point data structure for the step at 106 in FIG. 5). If not, block 222 is bypassed, so the target location for the step is constrained to that of the previous step. In the alternative, the target may always be set by the author regardless of what the primary lens was in the previous step, whereby block 221 may be omitted.

Next, in block 224, the author selects the level and concept identifiers for the point data structure from the available level and concept identifiers associated with the information elements displayed in the primary lens (which are stored in concept identifier 108 and level identifier 110 for the point data structure for the step). In the alternative, the level and concept identifiers may be constrained to those available from the information element located at the target location for the step.

Next, block 225 determines whether the step is a first step in the lesson, or whether the primary lens selected by the user for the step was a secondary lens in the previous step. If so, control passes to block 226, where the filter criteria or configuration for the primary lens is adjusted or confirmed, e.g., by opening a suitable dialog box as discussed in the aforementioned incorporated applications. The resulting information is stored in block 116 of the primary lens data structure of FIG. 5. In this step, it may be desirable to use the level identifier 110 for the point data structure to require the filter configuration of the primary lens to always pass the level identified by identifier 110 (e.g., by checking and greying out a suitable user interface component for controlling the filtering of the level identified in the point data structure so that the author may not unselect the level).

Returning to block 225, if the test is not met (indicating that the primary lens was a supplementary lens in the previous step), block 226 is bypassed so that the filter configuration for the primary lens is constrained to that of the previous step. In the alternative, block 225 may be omitted to always permit reconfiguration of the primary lens filter.

Next, in blocks 228 and 230, the author configures any desired secondary and/or supplementary lenses for the display format for the current step, e.g., by creating new lenses, closing undesired lenses, and/or modifying existing lenses, all in the same manner as described in the aforementioned incorporated applications. For secondary lenses, this process may include setting the filter criteria or configurations for such lenses, and for supplementary lenses, this process may include setting the shallow bounds of the lenses to predetermined target locations, both in a similar manner to that described above for the primary lens. As a result of this process, the secondary and/or supplementary lens information is stored in the lens configuration data structure for the step (e.g., in lists 118, 122 and 128).

In addition, it may also be desirable to use the concept identifier 108 for the point data structure to require the filter configurations of any secondary lenses to pass any levels associated with information elements having concept identifiers that are linked to concept identifier 108. Secondary lenses may also be required to pass the level identified by level identifier 110 for the point data structure.

Next, in block 231 the author optionally inputs guide information for the current step into the guide editor outrider lens to provide commentary or additional information about the step. The use of guide information may be useful, for example, when the author of the lesson is not the author of the body of knowledge, since the guide information is typically maintained separate from the body of knowledge.

Next, in block 232, it is determined whether the current step is the lesson destination (i.e., the last step in the sequence). If it is, then the step specification is saved in the lesson data structure in block 242, and process 220 is complete. If it is not, then the author decides in block 234 which lens (whether primary, supplementary or secondary) will be the primary lens for the next step. The author then attaches the next binder band to the primary lens for the next step in block 236, and the step specification information is saved in the lesson data structure in block 238. Then, the author depresses the "next" button in block 240 to initiate a transition to a next step, and the process is complete for the current step.

As a component of saving the step specification, it should be appreciated that various additional data in the lesson data structure is stored. For example, when a new step is processed, the previous step is known and may be saved in the guide data structure of the new step. Likewise, it is known from user selection what the next primary lens is for the current step. Also, when a new step is processed, the primary lens therefore may be obtained from the next primary lens selected in the previous pass through process 220.

It should be appreciated that a wide variety of alternate processes may be used to create an abstraction stack and a sequence of steps consistent with the invention. For example, rather than following a strict regimen (e.g., processing the primary lens, processing the secondary lenses, processing the supplementary lenses, etc.), an author may simply be permitted to edit the abstraction stack at will for any step, and then save the then-current configuration of the abstraction stack as the step display format. Other alternatives will be apparent to one of ordinary skill in the art.

Abstraction Stack Operation and Usage

The operation and usage of an abstraction stack consistent with the invention is now described. As discussed above, an event-driven system may be utilized herein to handle user interaction with an abstraction stack. As such, a main routine for event manager 37 of operating system 36 (FIG. 2) is illustrated at 250 in FIG. 9. It should be appreciated that non-event-driven implementations may be utilized in the alternative.

Figure 9:
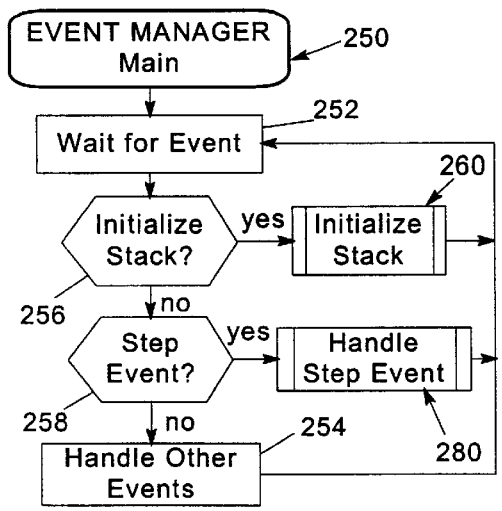
FIG. 9 is a flowchart illustrating the program flow of a main routine for an abstraction stack consistent with the invention.

Routine 250 may be considered to operate in an endless loop—typically as a dedicated process running in the background of operating system 36. As is well-known in the art, routine 250 waits for events at block 252 and passes such events to appropriate handling routines. Several such events consistent with the invention are detected at blocks 256 and 258. Also shown in FIG. 9 is a block 254 that handles the multitude of other types of events generated in the computer system, but which are not relevant to an understanding of the invention.

Furthermore, any of the various events described in the herein incorporated applications may also be detected and handled in the manners described therein, e.g., render stack events, create lens events, cross-over events, scroll events, etc. In general, an abstraction stack described herein utilizes many of the same events and processes in its implementation, with the primary differences highlighted herein. Where no modifications to these other events are pointed out herein, it should be assumed that such other events may be handled in a similar manner, and as such the reader is therefore directed to the herein incorporated applications for a more detailed discussion of such other events.

One event is an initialize stack event, which is detected by block 256 and handled by an initialize stack routine 260. Another event is a step event, which is detected by block 258 and handled by a handle step event routine 280.

Figure 10:
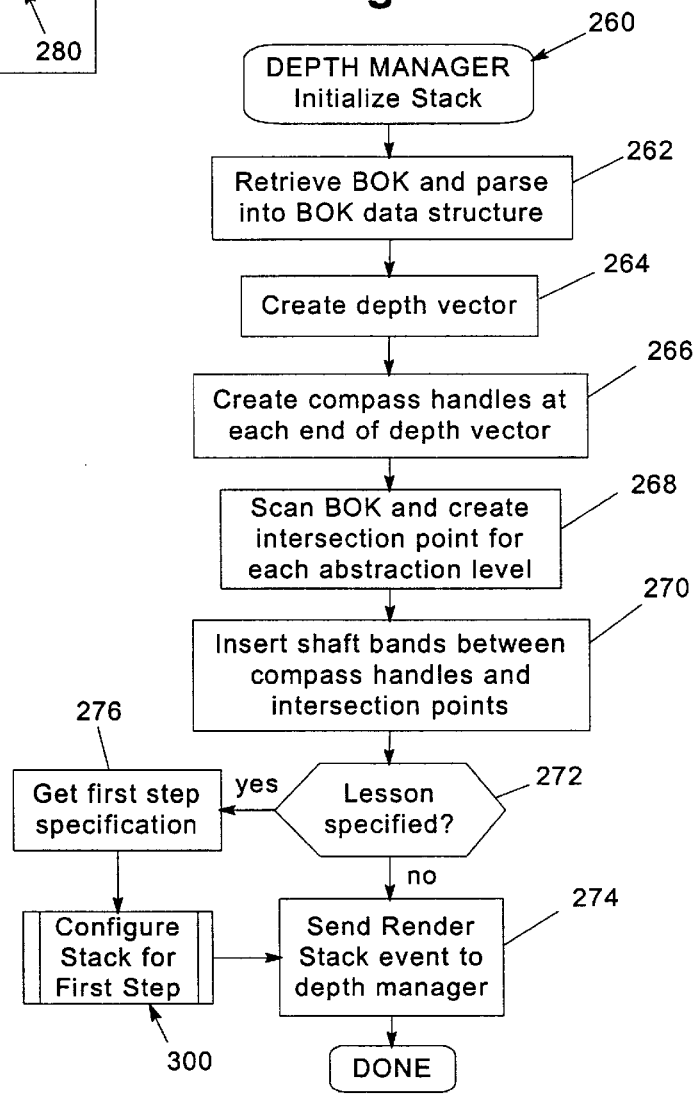
FIG. 10 is a block diagram of the initialize stark routine of FIG. 9.

Initialize stack routine 260 is illustrated in greater detail in FIG. 10, and operates in much the same manner as that disclosed in the aforementioned incorporated applications. Routine 260 begins at block 262 by retrieving a body of knowledge document and parsing the document into the data structure illustrated generally in FIG. 3. Next, in block 264, a depth vector object is created, or instanced, to generate a depth range along which objects to be displayed are located along an abstraction axis. A pair of compass handle objects are next created and linked to each end of the depth vector in block 266. Next, the body of knowledge data structure is scanned in block 268 to determine what levels of abstraction are defined therefor. From this information an intersection point object is created for each level of abstraction and linked to the depth vector. Next, in block 270, shaft band objects are created extending between each of the compass handles and intersection points.

Next, block 272 determines whether a lesson is specified for the given body of knowledge. If not, control passes directly to block 274 to generate a render stack event for the depth manager to initiate rendering of the abstraction stack on the computer display, prior to completion of routine 260. Handling of a render stack routine is described in greater detail in the aforementioned incorporated applications.

Returning to block 272, if a lesson is specified, control passes to block 276 to retrieve the first step specification in lesson data structure 100. Based upon this information, a configure stack for first step routine 300 is executed to configure the abstraction stack to display a representation specified for the first step in the lesson. Control then passes to block 274 to render the stack, and routine 260 is complete.

Figure 11:
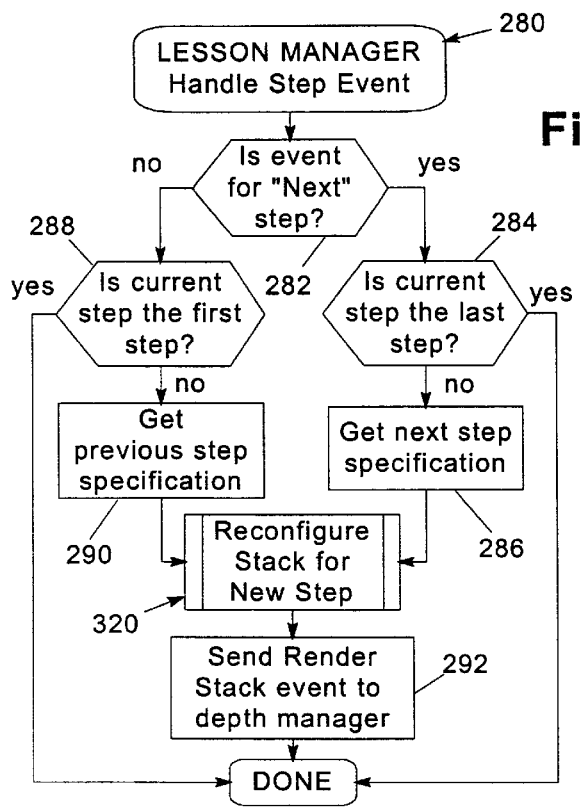
FIG. 11 is a block diagram of the handle step e(vent routine of FIG. 9.

Handle step event routine 280 is illustrated in greater detail in FIG. 11. This routine handles two types of step events. A first type is a next step event that is initiated in response to user selection of "next" button 192 on guide lens 180, so that a user can proceed to the next step in the lesson. A second type of step event is a previous step event that is initiated in response to user selection of "prev" button 190 on guide lens 180, so that a user can return to the immediately preceding step in the lesson. It should be appreciated that other step events mars be provided and handled by routine 280, e.g., a request to go to a specific step in the lesson, which may be initiated in response to selection of a specific button and/or providing input through dialog box, among others.

Routine 280 begins in block 282 by determining whether the step event is a request for the next step in the lesson. If so, control passes to block 284 to determine whether the current step is the last step in the sequence. If so, the destination for the lesson has been reached, and no further steps are available. As a result, the event is disregarded and routine 280 immediately terminates. If, however, the current step is not the last step, control passes to block 286 to retrieve the specification for the next step from the lesson data structure and set the next step as the current step. Based upon this information, a reconfigure stack for new step routine 320 is executed to reconfigure the abstraction stack to display the representation specified in the new step. Next, a render stack event is sent to the depth manager in block 292 to refresh the display of the abstraction stack, and routine 280 is complete.

Returning to block 282, if the event is not for the "next" step, it is assumed that the event is a request for the previous step in the lesson, and as a result, control passes to block 288 to determine whether the current step is the first step in the lesson. If so, no preceding steps are available, so the event is disregarded and routine 280 immediately terminates. If, however, the current step is not the first step, control passes to block 290 to retrieve the specification for the previous step from the lesson data structure and set the previous step as the current step. Based upon this information, routine 320 is executed to reconfigure the abstraction stack to display the representation specified in the new step. Next, a render stack event is sent to the depth manager in block 292 to refresh the display of the abstraction stack, and routine 280 is complete.

Figure 12:
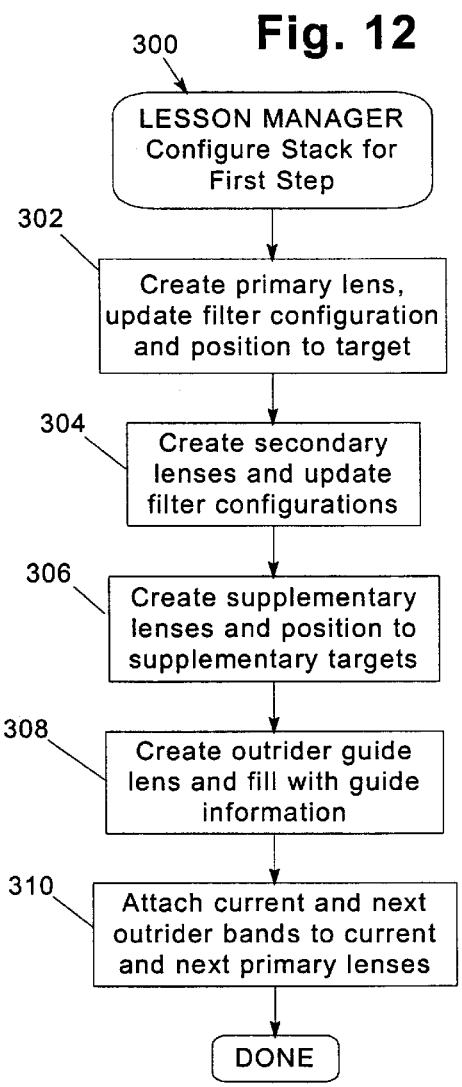
FIG. 12 is a flowchart illustrating the program flow of the configure stack for first step routine of FIG. 10.

Configure stack for first step routine 300 is illustrated in greater detail in FIG. 12. Routine 300 begins in block 302 by creating a primary lens, updating its filter configuration, and positioning the primary lens at the target, all based upon the point and lens configuration information from the first step specification for the lesson. Each of these operations are typically handled by passing appropriate events (e.g., create lens and update contents events) to the depth manager and primary lens, in a manner described in greater detail in the aforementioned incorporated applications. Updating the filter configuration may be performed during creation of the lens or before opening of the lens, e.g., by using the filter configuration defined by the step specification in lieu of a default filter configuration, and bypassing the presentation of any dialog box or other input mechanism to a user for modifying this configuration.

Next, in block 304, each secondary lens specified in the first step specification is created and updated with the filter configuration specified in the specification, in a manner similar to that for the primary lens. It should be appreciated, however, that since secondary lenses have a coordinated scrolling relationship with the primary lens, the create lens routine used to create such lenses will automatically scroll the secondary lenses to the same position in the body of knowledge as the primary lens when the lenses are opened.

Next, in block 306, each supplementary lens specified in the first step specification is created and scrolled to the target position specified in the specification, in a manner similar to that for the primary lens. It should be appreciated, however, that since supplementary lenses by definition inherit the filter configuration of their supplemented lens (whether the primary lens or one of the secondary lenses), the filter configurations for these lenses are automatically defined as the lenses are initially created, and updated (if necessary) before they are opened.

Next, in block 308, an outrider guide lens (e.g., lens, 180 in FIG. 6) is created and filled with the guide information specified in the first step specification. Creation of an outrider guide lens and painting information into the lens may be performed, for example, in a manner similar to that for a conventional window in a GUI-based operating system, given that the outrider guide lens typically does not have the same depth and filter constraints as an abstraction stack lens. In the alternative, the outrider guide lens may be handled as a special type of lens in an abstraction stack and processed in a similar manner to other lenses in the abstraction stack. In addition, creation of an outrider guide lens also includes creation of "prev" and "next" user interface components attached to the outrider guide lens (e.g., buttons 190, 192 in FIG. 6). These components may be created in a manner similar to a push button object in a GUI-based operating system, and may be configured to generate suitable previous step and next step events in response to user selection thereof to permit a user to sequence through the steps in a lesson in the manner described in greater detail above. Moreover, these components are preferably displayed as arrow-shaped objects to give the user the sense of action occurring forward or backward in a lesson in response to depression of either component. Other shapes and types of user interface components may be used in the alternative. Moreover, as discussed above, additional controls, e.g., a control that permits direct navigation to any step in the lesson, may also be utilized consistent with the invention.

Next, in block 310, current and next guide band objects are created and attached between the outrider guide lens and the current and next primary lenses specified in the first step specification (see, e.g., bands 194, 198 in FIG. 6) to permit a user to quickly ascertain where the user should direct his or her focus, and where the next step will take him or her. Since this is the first step, no previous step exists, and thus, no previous guide band is created in conjunction with this operation. After each band is created, routine 300 is complete.

The current guide band preferably extends from a location between the "prev" and "next" user interface components, while the next guide band preferably extends from a location at the tip of the arrow shape utilized for the, "next" user interface component. Each band terminates at the boundary of the particular lens specified as the current or next primary lens.

Figure 13:
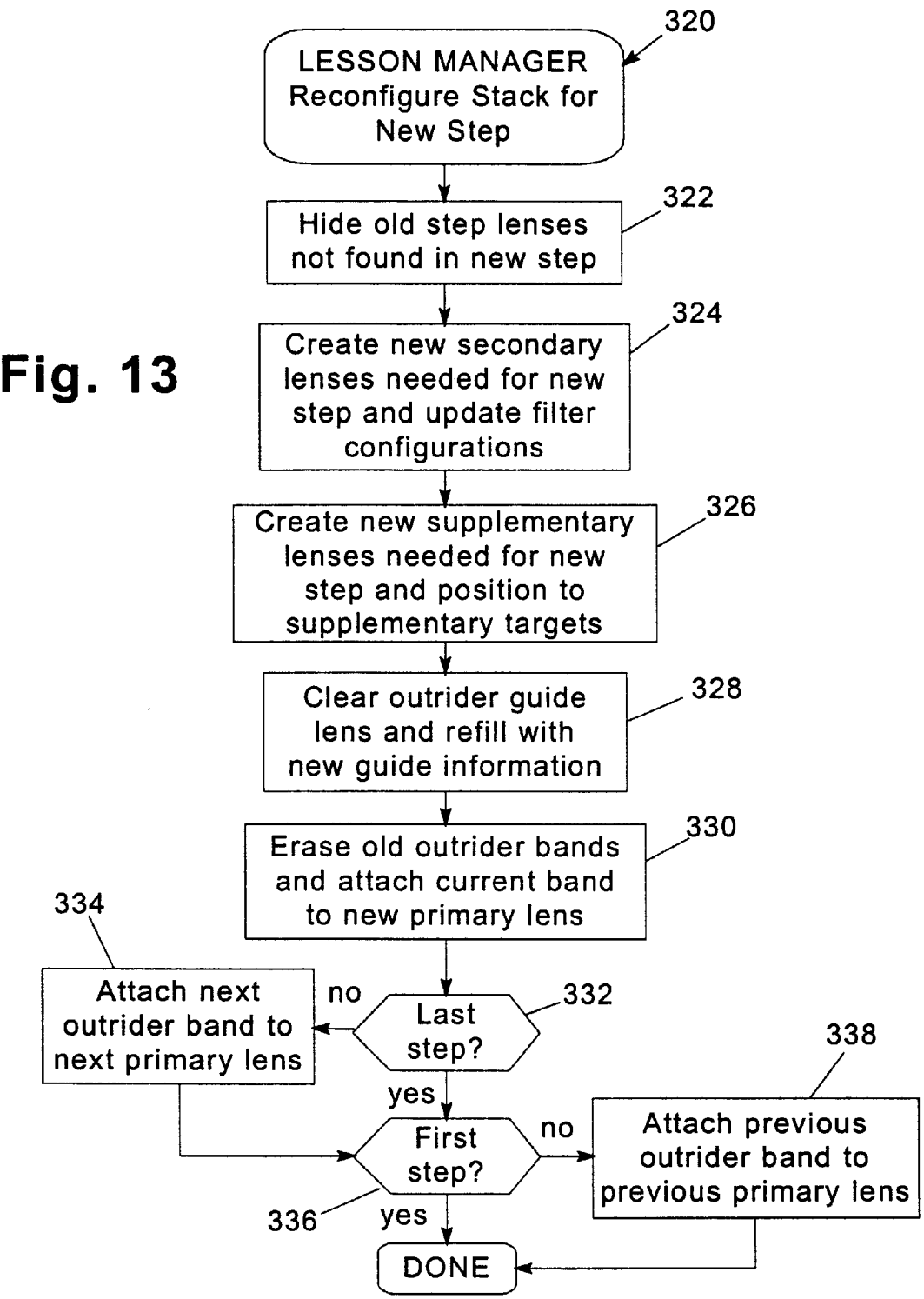
FIG. 13 is a flowchart illustrating the program flow of the reconfigure stack for new step routine of FIG. 11.

Reconfigure stack for new step routine 320 is illustrated in greater detail in FIG. 13. Routine 320 begins in block 322 by hiding all of the lenses opened in the old step that are not used in the new step, e.g., by comparing the step specification information for the new and old steps. Hiding a lens may include merely minimizing a lens to a minor lens, or may include closing or discarding the lens from the abstraction stack in the alternative.

Next, in blocks 324 and 326, any new secondary and supplementary lenses specified in the new step specification are created and updated with filter configurations, or scrolled to target positions, as specified in the new step specification, in a manner similar to the creation of secondary and supplementary lenses in blocks 304 and 306 of routine 300. Next, in block 328, the outrider guide lens is cleared and replaced with the new guide information specified in the new step specification.

Next, in block 330, the old guide bands between the, outrider guide lens and the lenses in the abstraction stack are erased, and a new current guide band is attached between the outrider guide lens and the new primary lens specified in the new step specification. Next, block 332 determines whether the new step is the last step in the lesson. If so, control is passed to block 336. However, if not, block 334 is executed prior to passing control to block 336 to attach a next guide band between the outrider guide lens and the next primary lens specified in the new step specification. Block 336 similarly determines whether the new step is the first step in the lesson, and if so, immediately terminates the routine. If not, block 338 is executed prior to completion of the routine to attach a previous guide band between the outrider guide lens and the previous primary lens specified in the new step specification. Thus, it should be appreciated that blocks 332–338 basically operate to add next or previous guide bands only when corresponding next or previous steps exist in the lesson relative to the new step.

As an example of the operation of an abstraction stack consistent with the invention, FIG. 6 illustrates one suitable display format for an abstraction stack 140 during a predetermined step in a lesson plan based on the example body of knowledge of Table I. In this example, the predetermined step defined by an author or teacher includes a point defined to include a target location that is at the beginning of the information element defined at line 8 of Table I, since the current step's primary lens (lens 150) was a secondary lens having a coordinated scrolling arrangement with the previous step's primary lens (lens 160, as indicated by previous guide band 196). The level and concept identifiers for the point are selected from those available with the information elements in the lens (e.g., a level identifier of "two", and a concept identifier of "mobility"). The author of the lesson also defines a lens configuration in the manner described above, including a primary lens 150 that passes level "two" information elements, including that at line 9 of Table I from which the point is partially derived.

The author may also include secondary and/or supplementary lenses in the lens configuration. For example, secondary lenses 155, 160 may be defined to respectively pass level "three" and level "one" information elements, with a coordinated scrolling arrangement established with the primary lens. Typically, lens 160 is inherently included as it was the primary lens in the previous step. Supplementary lenses, e.g., lenses 165, 170, may also be defined which inherit the filter configuration of the primary lens (i.e., by passing level "two" information elements), but having different targets in the body of knowledge (i.e., at the beginnings of the information elements defined respectively at lines 12 and 15 of Table I).

Guide information, including the following text, is also stored with the step by the author and presented in guide lens 180:

"There are many ways to make things mobile. Making things capable of moving themselves always involves some sort of engine . . . "

Moreover, with this configuration, a current step guide band 194 is illustrated as extending from guide lens 180 to primary lens 150, with a previous guide band 196 extending from the lens to secondary lens 160 (indicating that lens 160 is the primary lens for the previous step in the lesson), and with a next guide band 198 extending from the lens to supplementary lens 165 (indicating that lens 165 is the primary lens for the next step in the lesson).

Based upon the step display format of FIG. 6, it may be seen that a student is being transitioned from a previous step, where the student learned about how objects become mobile (by virtue of the earlier focus in lens 160), to the current step, where different examples of mobile objects are being presented in lenses 150, 165 and 170. Secondary lens 155 provides more detail about an automobile example; however, the author has also chosen to concurrently display some basic information about the airplane and person examples for the purpose of illustrating the similarities and differences between the objects.

Figure 14:
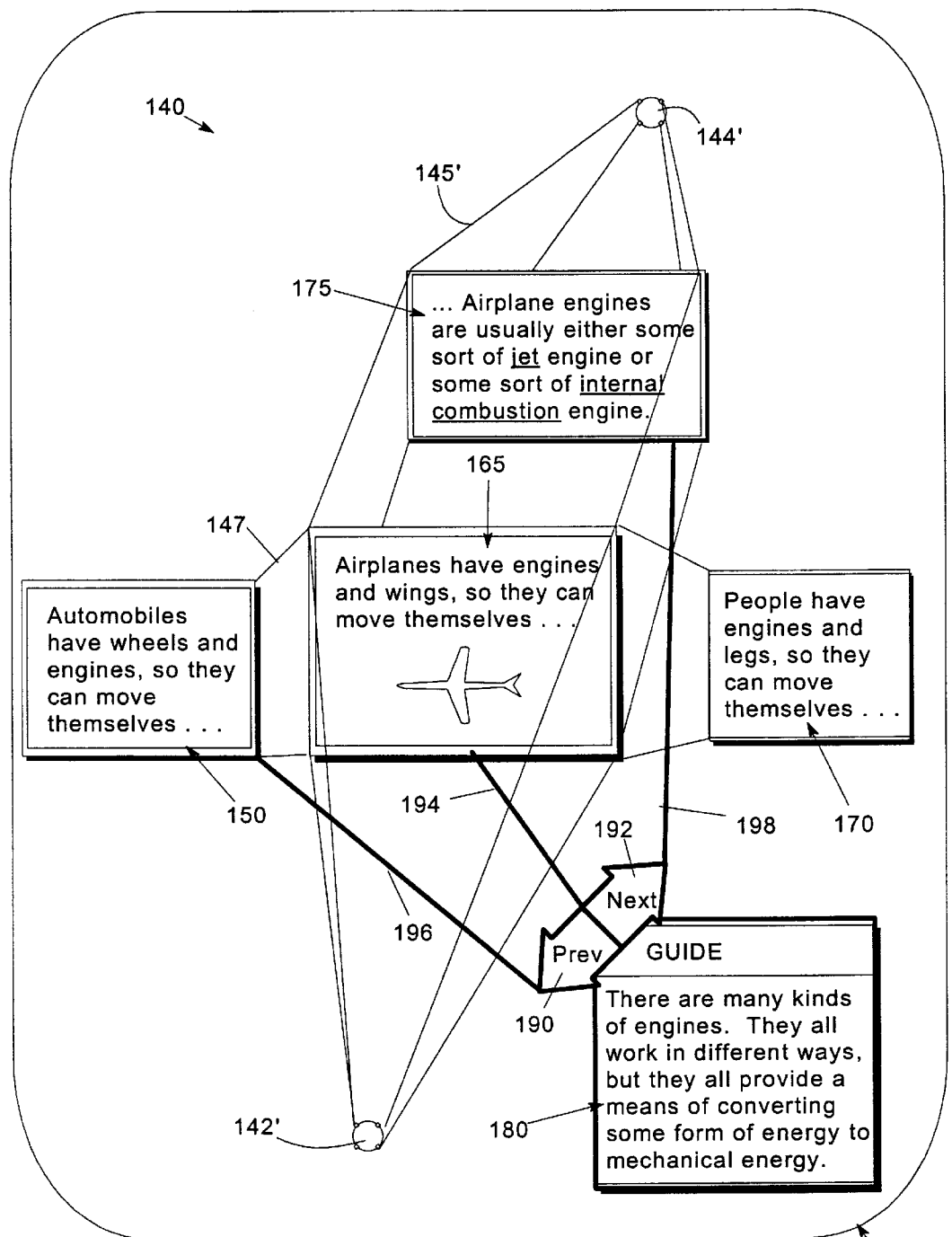
FIG. 14 is a block diagram of the computer display of FIG. 6, illustrating a second representation of the abstraction stack after processing of a next step event.

Now turning to FIG. 14, the display format for a next step in the lesson described above is presented, which is presented in response to user depression of next button 192 when the abstraction stack has the display format shown in FIG. 6. For this next step, a transition occurs from presenting a display format that focuses on the automobile example to a display format that focuses on the airplane example, e.g., to illustrate the similarities and differences between these types of objects. In addition, as may be seen from the updated guide information, the lesson attempts to transition from a view of the different examples to a discussion more specifically about engines and the ways in which objects are moved.

In this next step, the primary lens becomes lens 165 as indicated in the earlier step by next guide band 198. The point is selected by the author to have a target that is the beginning of the information element defined at line 12 of Table I. In the alternative, the target may be constrained to remain at the same position as it was before the lens was selected to be the primary lens. By setting the target to the information element at line 12 of Table I, the level identifier for the point is level "two", and the concept identifier for the point is "mobility". The author of the lesson also defines a lens configuration in the manner described above, including the primary 165 that passes level "two" information elements, including that at line 12 of Table I from which the point is partially derived.

The author also includes appropriate secondary and/or supplementary lenses in the lens configuration. For example, lenses 150 and 170 are maintained in open states as supplementary lenses for primary lens 165 so that the contrast between the example objects may be viewed by a student. In addition, since the focus is on the airplane example, the secondary lenses for the previous step (lenses 155, 160 of FIG. 6) may be closed, with a new secondary lens 175 being defined to pass the level "three" information elements, including the information element defined at line 13 of Table I, with a coordinated scrolling arrangement established with the primary lens. New guide information, including the following text that is stored with the step by the author, is updated and presented in guide lens 180:

"There are many kinds of engines. They all work in different ways, but they all provide a means of converting some form of energy to mechanical energy."

Moreover, with this configuration, the current step guide band 194 is updated to extend from guide lens 180 to the new primary lens 165, with the previous guide band 196 extending from the guide lens to the previous primary lens (lens 150), and with the next guide band 198 extending from the lens to secondary lens 175 (indicating that lens 175 is the primary lens for the next step in the lesson).

As illustrated in FIG. 14, it may also be desirable to adjust the primary depth vector to extend through the current primary lens (here, lens 165), such that alternate binder bands 145' are displayed as extending between alternate compass handles 142', 144'. In the alternative, the depth vector may remain in a fixed orientation.

It will therefore be appreciated that through the use of a sequence of predetermined display formats, information from a body of knowledge may be presented in a logical and controlled fashion to a user to enhance user comprehension of a body of knowledge. However it should also be appreciated that the above examples merely provide but one of an innumerable variety of applications and subjects for presenting a body of knowledge in the structured manner described herein.

Various modifications may be made to the embodiments described herein without departing from the spirit and scope of the invention. For example, steps may define additional characteristics of a display format, e.g., the size and/or position of lenses, the link pointer highlighting settings for an abstraction stack, initial and/or subsequent placement of the crossover cursor, etc. Also, while a predetermined display format is typically stored for each step that defines a point, a lens configuration and guide information, it should be appreciated that certain steps may omit one or more of these components of the display format for the abstraction stack. For example, in some implementations it may be possible to use the same primary lens and/or lens configuration for sequential steps, with only the point and/or guide information changing between the steps.

Furthermore, a guide may use audio/visual information as well as other forms, and may even be in the form of a multi-level body of knowledge presented via a separate abstraction stack.

In addition, when an abstraction stack is presented in a predetermined display format, it may be desirable to either permit or prohibit a student from modifying the display format, e.g., through scrolling to different locations in the body of knowledge; reconfiguring, repositioning or resizing lenses; modifying lens filter configurations or other settings; creating new lenses; closing undesired lenses, etc. For example, it may be desirable for a student to utilize an abstraction stack as a notebook having a sequence of "note" steps that are more or less analogous to lesson steps.

Furthermore, in an alternate implementation, points may be specified by highlighting or otherwise selecting a conditioned element rather than inherently through identifying the lens' shallow bound by positioning the lens display. As a result, a point's target and a primary lens' target do not have to be the same location in the body of knowledge.

As another alternative, a lesson may include steps including lenses opened on multiple bodies of knowledge. This could be accomplished by having supplementary lens targets to identify a specific body of knowledge as well as an offset.

In addition, in some implementations, a lesson path may be constructed using a constrained set of lens configuration transitions. For example, if a next step's primary lens is a secondary or supplementary lens in the current step, it may be desirable to prevent the primary lens target from changing in the next step if the lens is a secondary lens in the current step. Alternative implementations may be more restrictive as long as they allow something to change between the steps. Other implementations may also be less restrictive, even to the point of not requiring anything to be common between adjacent steps.

As another alternative, it may be desirable for a lens configuration within a step structure to specify teacher-imposed levels of abstraction, optionally inserted between levels of abstraction defined in the body of knowledge, and optionally including an alternative abstraction scheme. One useful application of this implementation would be to permit lessons to be constructed from a null body of knowledge—one with no information elements. The implementation may also be used to impose additional levels—within the context of the lesson—on tagged information elements. For example, a teacher may be permitted to open and select a target in a lens that passes all levels. Then, the teacher may arbitrarily attach the lens to the depth vector at an appropriate point and adjust the filter configuration to pass at least the target information element.

Additional modifications to the embodiments described herein will be apparent to one of ordinary skill in the art. Therefore, the invention lies in the claims hereinafter appended.

What is claimed is:

1. A method of presenting information from a body of knowledge to a user on a computer display, the body of knowledge stratified into a plurality of levels of abstraction and including a plurality of information elements associated with the plurality of levels of abstraction, the method comprising:

(a) displaying an abstraction stack on the computer display in a three-dimensional workspace, the abstraction stack having associated therewith a predetermined sequence of steps, each step defining a predetermined display format for the abstraction stack, each predetermined display format specifying at least one of a position in the body of knowledge and a lens configuration for the abstraction stack, each lens configuration specifying at least one lens configured to display at least a portion of the body of knowledge;

(b) at a first predetermined step in the sequence of steps, configuring the abstraction stack to display at least a portion of the body of knowledge in the predetermined display format defined by the first predetermined step; and (c) in response to a transition to a second step in the sequence of steps that specifies a different lens configuration from that specified by the first step, reconfiguring the lens configuration for the abstraction stack to display at least a portion of the body of knowledge in the predetermined display format defined by the second predetermined step.

2. The method of claim 1, further comprising, if the predetermined display format defined by the second predetermined step specifies a predetermined position in the body of knowledge, updating at least one lens in the abstraction stack to display at least a portion of an information element disposed at the predetermined position in the body of knowledge.

3. The method of claim 1, wherein the abstraction stack includes an arrangement of lenses, and wherein reconfiguring the lens configuration for the abstraction stack includes altering the arrangement of lenses displayed in the abstraction stack based upon the predetermined lens configuration specified by the second predetermined step.

4. The method of claim 3, wherein each lens in the abstraction stack includes a filter criteria that filters the body of knowledge into a filtered set of information elements, and wherein altering the arrangement of lenses includes modifying the filter criteria of at least one lens in the arrangement of lenses.

5. The method of claim 4, wherein the filter criteria for at least one lens in the abstraction stack applies a focus effect to information elements associated with at least one predetermined level of abstraction.

6. The method of claim 5, wherein the arrangement of lenses includes at least one supplementary lens associated with the primary lens, the supplementary lens configured with a filter criteria that is the same as that of the primary lens.

7. The method of claim 4, wherein altering the arrangement of lenses includes hiding a lens specified by the lens configuration for the first predetermined step but not specified by the lens configuration for the second predetermined step.

8. The method of claim 4, wherein altering the arrangement of lenses includes creating a lens specified by the lens configuration for the second predetermined step but not specified by the lens configuration for the first predetermined step.

9. The method of claim 4, wherein altering the arrangement of lenses includes designating a predetermined lens from the plurality of lenses as a primary lens.

10. The method of claim 9, wherein the arrangement of lenses includes at least one secondary lens associated with the primary lens, the method further comprising scrolling the primary and secondary lenses in a coordinated fashion in response to user input.

11. The method of claim 9, wherein the second predetermined step immediately succeeds the first predetermined step in the sequence of steps, the method further comprising receiving user input from a user interface component, the user interface component configured to initiate the transition from the first predetermined step to the second predetermined step in response to user selection thereof.

12. The method of claim 11, further comprising, prior to reconfiguring the lens configuration for the abstraction stack, displaying a next guide band extending between the user interface component and the primary lens specified by the second predetermined step.

13. The method of claim 12, further comprising displaying a current guide band coupled to a primary lens specified by the first predetermined step.

14. The method of claim 12, wherein a third predetermined step in the sequence of steps immediately precedes the first predetermined step, the method further comprising:
  (a) receiving user input from a second user interface component, the second user interface component configured to initiate the transition from the first predetermined step to the third predetermined step in response to user selection thereof; and
  (b) prior to reconfiguring the lens configuration for the abstraction stack, displaying a previous guide band extending between the second user interface component and a primary lens specified by the third predetermined step.

15. The method of claim 3, wherein the arrangement of lenses includes at least first and second lenses, the method further comprising respectively orienting the first and second lenses at first and second positions along an abstraction axis defined in the three-dimensional workspace.

16. The method of claim 15, further comprising displaying a connector element extending between the first and second lenses.

17. The method of claim 1, wherein at least one step in the sequence of steps specifies guide information associated with the step, and wherein reconfiguring the lens configuration for the abstraction stack includes, if the second predetermined step specifies guide information, displaying in a guide lens the guide information for the second predetermined step.

18. The method of claim 1, wherein the second predetermined step immediately precedes the first predetermined step in the sequence of steps.

19. The method of claim 1, wherein the second predetermined step immediately succeeds the first predetermined step in the sequence of steps.

20. A computer system configured to present information from a body of knowledge to a user, the body of knowledge stratified into a plurality of levels of abstraction and including a plurality of information elements associated with the plurality of levels of abstraction, the computer system comprising:
  (a) a computer display; and
  (b) a processor, coupled to the computer display, the processor configured to (1) display an abstraction stack on the computer display in a three-dimensional workspace, the abstraction stack having associated therewith a predetermined sequence of steps, each step defining a predetermined display format for the abstraction stack, each predetermined display format specifying at least one of a position in the body of knowledge and a lens configuration for the abstraction stack, each lens configuration specifying at least one lens configured to display at least a portion of the body of knowledge; (2) at a first predetermined step in the sequence of steps, to configure the abstraction stack to display at least a portion of the body of knowledge in the predetermined display format defined by the first predetermined step; and (3) in response to a transition to a second step in the sequence of steps that specifies a different lens configuration from that specified by the first step, to reconfigure the lens configuration for the abstraction stack to display at least a portion of the body of knowledge in the predetermined display format defined by the second predetermined step.

21. A program product, comprising:
  (a) a program configured to perform a method of presenting information from a body of knowledge to a user on a computer display, the body of knowledge stratified into a plurality of levels of abstraction and including a plurality of information elements associated with the plurality of levels of abstraction, the method comprising:
    (1) displaying an abstraction stack on the computer display in a three-dimensional workspace, the abstraction stack having associated therewith a predetermined sequence of steps, each step defining a predetermined display format for the abstraction stack, each predetermined display format specifying at least one of a position in the body of knowledge and a lens configuration for the abstraction stack, each lens configuration specifying at least one lens configured to display at least a portion of the body of knowledge;

(2) at a first predetermined step in the sequence of steps, configuring the abstraction stack to display at least a portion of the body of knowledge in the predetermined display format defined by the first predetermined step; and (3) in response to a transition to a second step in the sequence of steps that specifies a different lens configuration from that specified by the first step, reconfiguring the lens configuration for the abstraction stack to display at least a portion of the body of knowledge in the predetermined display format defined by the second predetermined step; and (b) a signal bearing media bearing the program.

22. The program product of claim 21, wherein the signal bearing media is transmission type media.

23. The program product of claim 21, wherein the signal bearing media is recordable media.

24. A method of creating a presentation of information from a body of knowledge, the body of knowledge stratified into a plurality of levels of abstraction and including a plurality of information elements associated with the plurality of levels of abstraction, the method comprising:

(a) defining a sequence of steps; and (b) for each step in the sequence of steps, defining a predetermined display format for an abstraction stack to be displayed to an end user, each predetermined display format specifying at least one of a position in the body of knowledge and a lens configuration for the abstraction stack, the lens configuration specifying at least one lens configured to display at least a portion of the body of knowledge, wherein the sequence of steps includes at least first and second steps that specify different lens configurations such that a transition between the first and second steps results in reconfiguration of the lens configuration for the abstraction stack.

25. The computer system of claim 20, wherein the abstraction stack includes an arrangement of lenses, and wherein the processor is configured to reconfigure the lens configuration for the abstraction stack by altering the arrangement of lenses displayed in the abstraction stack based upon the predetermined lens configuration specified by the second predetermined step.

26. The computer system of claim 25, wherein each lens in the abstraction stack includes a filter criteria that filters the body of knowledge into a filtered set of information elements, and wherein the processor is configured to alter the arrangement of lenses by modifying the filter criteria of at least one lens in the arrangement of lenses.

27. The computer system of claim 26, wherein the filter criteria for at least one lens in the abstraction stack applies a focus effect to information elements associated with at least one predetermined level of abstraction.

28. The computer system of claim 27, wherein the processor is configured to alter the arrangement of lenses by hiding a lens specified by the lens configuration for the first predetermined step but not specified by the lens configuration for the second predetermined step.

29. The computer system of claim 27, wherein the processor is configured to alter the arrangement of lenses by creating a lens specified by the lens configuration for the second predetermined step but not specified by the lens configuration for the first predetermined step.

30. The computer system of claim 27, wherein the processor is configured to alter the arrangement of lenses by designating a predetermined lens from the plurality of lenses as a primary lens.

31. The computer system of claim 20, wherein the second predetermined step immediately succeeds the first predetermined step in the sequence of steps, wherein the processor is further configured to receive user input from a user interface component, the user interface component configured to initiate the transition from the first predetermined step to the second predetermined step in response to user selection thereof.

32. The computer system of claim 20, wherein at least one step in the predetermined sequence of steps specifies guide information associated with the step, and wherein the processor is further configured to, if the second predetermined step specifies guide information, display in a guide lens the guide information for the second predetermined step.

* * * * *